United States Patent
Dorsey et al.

(10) Patent No.: US 12,175,448 B2
(45) Date of Patent: *Dec. 24, 2024

(54) PROXIMITY-BASED PAYMENTS

(71) Applicant: Block, Inc., Oakland, CA (US)

(72) Inventors: Jack Dorsey, Oakland, CA (US); Brian Grassadonia, Oakland, CA (US); Robert Andersen, Oakland, CA (US)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/710,555

(22) Filed: Mar. 31, 2022

(65) Prior Publication Data

US 2022/0222651 A1 Jul. 14, 2022

Related U.S. Application Data

(63) Continuation of application No. 16/828,817, filed on Mar. 24, 2020, now Pat. No. 11,354,645, which is a
(Continued)

(51) Int. Cl.
*G06Q 20/10* (2012.01)
*G06Q 20/32* (2012.01)
*G06Q 20/40* (2012.01)

(52) U.S. Cl.
CPC ........... *G06Q 20/327* (2013.01); *G06Q 20/10* (2013.01); *G06Q 20/3255* (2013.01); *G06Q 20/40* (2013.01)

(58) Field of Classification Search
None
See application file for complete search history.

(56) References Cited

U.S. PATENT DOCUMENTS

| 4,838,384 A | 6/1989 | Thangavelu |
| 5,506,898 A | 4/1996 | Costantini et al. |

(Continued)

FOREIGN PATENT DOCUMENTS

| JP | 2004102570 A | 4/2004 |
| JP | 2005-182338 A | 7/2005 |

(Continued)

OTHER PUBLICATIONS

Zhu, Y., "A new architecture for secure two-party mobile payment transactions", (Order No. MR68790), Available from ProQuest Dissertations and Theses Professional (822410582), Retrieved from Internet URL: https://dialog.proquest.com/professional/docview/822410582?accountid=131444, (2010), 239 pages.

(Continued)

*Primary Examiner* — Christopher Bridges
(74) *Attorney, Agent, or Firm* — Polsinelli P.C.

(57) ABSTRACT

Techniques disclosed include systems and methods including, in association with a transaction between a first payer and a payee, determining a second payer that is associated with the transaction. Techniques include receiving specification of a portion of a payment amount associated with the transaction to be requested from the second payer. Techniques include, upon receiving an indication from the first payer to request payment of the portion of the payment amount from the second payer, transmitting an identifier associated with the second payer and the specified portion of the payment amount to a remote server. The remote server can be configured to transmit a request to a second mobile device associated with the second payer to permit a transfer of the portion of the payment amount from the financial account of the second payer in association with the transaction.

20 Claims, 13 Drawing Sheets

Related U.S. Application Data continuation of application No. 14/296,385, filed on Jun. 4, 2014, now Pat. No. 10,614,445.

(56) References Cited

U.S. PATENT DOCUMENTS

| | | |
|---|---|---|
| 5,991,749 A | 11/1999 | Morrill |
| 6,157,927 A | 12/2000 | Schaefer et al. |
| 6,173,272 B1 | 1/2001 | Thomas et al. |
| D458,271 S | 6/2002 | Huang et al. |
| 6,513,018 B1 | 1/2003 | Culhane |
| 6,707,905 B2 | 3/2004 | Lenard |
| 6,829,583 B1 | 12/2004 | Knapp et al. |
| 6,839,566 B2 | 1/2005 | Casaccia et al. |
| 6,847,942 B1 | 1/2005 | Land et al. |
| 6,876,993 B2 | 4/2005 | LaButte et al. |
| 7,089,208 B1 | 8/2006 | Levchin et al. |
| 7,254,406 B2 * | 8/2007 | Beros ............ H04L 9/40 455/456.3 |
| 7,343,335 B1 | 3/2008 | Olliphant |
| 7,349,871 B2 | 3/2008 | Labrou et al. |
| 7,376,587 B1 * | 5/2008 | Neofytides ...... G06Q 30/0615 705/26.35 |
| 7,383,226 B2 | 6/2008 | Kight et al. |
| 7,580,719 B2 | 8/2009 | Karmarkar |
| 7,606,734 B2 * | 10/2009 | Baig ............... G06Q 30/0609 705/37 |
| 7,620,404 B2 * | 11/2009 | Chesnais .......... H04M 1/2757 455/456.3 |
| 7,668,766 B1 | 2/2010 | Goodwin, III et al. |
| 7,694,287 B2 | 4/2010 | Singh et al. |
| 7,783,537 B1 | 8/2010 | Van Luchene et al. |
| 8,010,601 B2 * | 8/2011 | Jennings ............ H04W 4/02 709/204 |
| 8,015,070 B2 | 9/2011 | Sinha et al. |
| 8,020,763 B1 | 9/2011 | Kowalchyk et al. |
| 8,055,564 B2 | 11/2011 | Wehunt et al. |
| 8,065,190 B2 | 11/2011 | Collas et al. |
| 8,090,616 B2 * | 1/2012 | Proctor, Jr. ......... H04L 67/306 370/329 |
| 8,090,656 B2 | 1/2012 | Solomon et al. |
| 8,208,388 B2 | 6/2012 | Casaccia et al. |
| 8,341,074 B1 | 12/2012 | Reid |
| 8,385,964 B2 * | 2/2013 | Haney .............. H04W 4/50 455/457 |
| 8,401,968 B1 | 3/2013 | Schattauer et al. |
| 8,408,992 B2 | 4/2013 | de Cuba |
| 8,428,079 B1 * | 4/2013 | Lambert ............ H04W 8/005 370/254 |
| 8,498,900 B1 | 7/2013 | Spirin et al. |
| 8,500,010 B1 | 8/2013 | Marcus et al. |
| 8,571,975 B1 | 10/2013 | Lehman et al. |
| 8,606,703 B1 | 12/2013 | Dorsey et al. |
| 8,615,445 B2 | 12/2013 | Dorsey et al. |
| 8,655,837 B2 | 2/2014 | Beckstrom et al. |
| 8,661,046 B2 | 2/2014 | King et al. |
| 8,694,435 B1 | 4/2014 | Bishop |
| 8,700,526 B1 | 4/2014 | Cozens et al. |
| 8,751,379 B1 | 6/2014 | Bueche, Jr. |
| 8,762,272 B1 | 6/2014 | Cozens et al. |
| D709,914 S | 7/2014 | Berdan et al. |
| 9,092,776 B2 | 7/2015 | Dessert |
| 9,092,828 B2 | 7/2015 | Hosp |
| 9,264,850 B1 * | 2/2016 | Lee ................. G06Q 30/0261 |
| 9,378,491 B1 | 6/2016 | Grassadonia et al. |
| D764,543 S | 8/2016 | Delia |
| D776,687 S | 1/2017 | Wick et al. |
| 9,576,284 B2 | 2/2017 | Runyan |
| D783,658 S | 4/2017 | Hurst et al. |
| D785,031 S | 4/2017 | Bhat et al. |
| D785,043 S | 4/2017 | Montgomery et al. |
| 9,652,769 B1 | 5/2017 | Golin |
| 9,665,858 B1 | 5/2017 | Kumar |
| D790,577 S | 6/2017 | Hatzikostas et al. |
| 9,710,821 B2 | 7/2017 | Heath |
| 9,715,709 B2 | 7/2017 | Carlson |
| 9,767,443 B1 | 9/2017 | Wilson et al. |
| D801,387 S | 10/2017 | Lemay et al. |
| 9,799,071 B1 | 10/2017 | Wilson et al. |
| 9,805,358 B2 | 10/2017 | Green et al. |
| D808,978 S | 1/2018 | Hazam et al. |
| 9,875,469 B1 | 1/2018 | Chin et al. |
| D809,528 S | 2/2018 | Hazam et al. |
| 9,990,621 B1 | 6/2018 | Ng et al. |
| D829,765 S | 10/2018 | Crawford |
| 10,242,351 B1 | 3/2019 | Wilson et al. |
| 10,339,506 B2 | 7/2019 | Kassemi et al. |
| 10,387,874 B1 | 8/2019 | Birand et al. |
| 10,410,184 B2 | 9/2019 | Green et al. |
| 10,552,828 B2 | 2/2020 | Hammad |
| 10,614,445 B2 | 4/2020 | Dorsey et al. |
| 10,621,563 B1 | 4/2020 | Spindel et al. |
| 10,769,619 B2 | 9/2020 | Bennett |
| 10,963,868 B1 | 3/2021 | McCauley et al. |
| 11,023,869 B1 | 6/2021 | Kumar |
| 11,023,878 B1 | 6/2021 | Hernandez et al. |
| 11,270,278 B2 | 3/2022 | Kumar |
| 11,354,645 B1 | 6/2022 | Dorsey et al. |
| 11,410,139 B1 | 8/2022 | Spindel et al. |
| 11,423,394 B1 | 8/2022 | McCauley et al. |
| 11,829,964 B2 | 11/2023 | Spindel et al. |
| 2001/0014878 A1 | 8/2001 | Mitra et al. |
| 2002/0057285 A1 | 5/2002 | James |
| 2002/0114442 A1 | 8/2002 | Lieberman et al. |
| 2002/0116331 A1 | 8/2002 | Cataline et al. |
| 2002/0161630 A1 | 10/2002 | Kern et al. |
| 2002/0194141 A1 | 12/2002 | Langensteiner et al. |
| 2003/0028483 A1 | 2/2003 | Sanders et al. |
| 2003/0037074 A1 | 2/2003 | Dwork et al. |
| 2003/0045272 A1 * | 3/2003 | Burr ................ H04L 67/306 455/410 |
| 2003/0061170 A1 | 3/2003 | Uzo |
| 2003/0120936 A1 | 6/2003 | Farris et al. |
| 2003/0126076 A1 * | 7/2003 | Kwok .............. G06Q 20/3255 705/40 |
| 2004/0039630 A1 | 2/2004 | Begole et al. |
| 2004/0044616 A1 | 3/2004 | Salter |
| 2004/0113928 A1 | 6/2004 | Kobayashi et al. |
| 2004/0148252 A1 * | 7/2004 | Fleishman .......... G06Q 20/223 705/39 |
| 2004/0177005 A1 | 9/2004 | Poltorak |
| 2004/0230489 A1 | 11/2004 | Goldthwaite et al. |
| 2004/0230526 A1 | 11/2004 | Praisner |
| 2004/0264466 A1 | 12/2004 | Huang |
| 2005/0165684 A1 | 7/2005 | Jensen et al. |
| 2005/0174975 A1 | 8/2005 | Mgrdechian et al. |
| 2005/0286686 A1 | 12/2005 | Krstulich |
| 2006/0064380 A1 | 3/2006 | Zukerman |
| 2006/0106716 A1 | 5/2006 | Hurwitz et al. |
| 2006/0111945 A1 | 5/2006 | Tinsley et al. |
| 2006/0112006 A1 | 5/2006 | Hurwitz et al. |
| 2006/0112007 A1 | 5/2006 | Hurwitz et al. |
| 2006/0129484 A1 | 6/2006 | Hurwitz et al. |
| 2006/0146839 A1 | 7/2006 | Hurwitz et al. |
| 2006/0148532 A1 * | 7/2006 | Schnurr ............ H04W 64/003 455/567 |
| 2006/0224542 A1 | 10/2006 | Yalamanchi |
| 2006/0229984 A1 | 10/2006 | Miyuki |
| 2006/0235796 A1 | 10/2006 | Johnson et al. |
| 2006/0259358 A1 | 11/2006 | Robinson et al. |
| 2006/0277550 A1 | 12/2006 | Williams et al. |
| 2006/0288367 A1 | 12/2006 | Swix et al. |
| 2007/0078771 A1 | 4/2007 | Allin et al. |
| 2007/0106558 A1 | 5/2007 | Mitchell et al. |
| 2007/0124721 A1 * | 5/2007 | Cowing ............. G06F 16/487 717/100 |
| 2007/0136118 A1 | 6/2007 | Gerlach et al. |
| 2007/0150411 A1 | 6/2007 | Addepalli et al. |
| 2007/0174080 A1 | 7/2007 | Outwater |
| 2007/0198382 A1 | 8/2007 | Ferrari |
| 2007/0203836 A1 | 8/2007 | Dodin |
| 2007/0208816 A1 | 9/2007 | Baldwin et al. |
| 2007/0233615 A1 | 10/2007 | Tumminaro |
| 2007/0255652 A1 | 11/2007 | Tumminaro et al. |

(56) References Cited

U.S. PATENT DOCUMENTS

| | | | |
|---|---|---|---|
| 2007/0255653 A1* | 11/2007 | Tumminaro | G06Q 20/3255 705/39 |
| 2007/0256035 A1 | 11/2007 | Matsuzawa et al. | |
| 2007/0265984 A1* | 11/2007 | Santhana | G06Q 20/26 705/65 |
| 2008/0004989 A1 | 1/2008 | Yi | |
| 2008/0010190 A1* | 1/2008 | Rackley, III | G06Q 20/3223 705/39 |
| 2008/0052176 A1 | 2/2008 | Buchheit | |
| 2008/0154798 A1 | 6/2008 | Valz | |
| 2008/0162340 A1 | 7/2008 | Zimmer et al. | |
| 2008/0167980 A1 | 7/2008 | Aaron et al. | |
| 2008/0182591 A1* | 7/2008 | Krikorian | H04W 68/00 455/456.3 |
| 2008/0183619 A1 | 7/2008 | Gould et al. | |
| 2008/0201769 A1 | 8/2008 | Finn | |
| 2008/0320036 A1 | 12/2008 | Winter | |
| 2009/0006151 A1 | 1/2009 | Zarghami et al. | |
| 2009/0006398 A1 | 1/2009 | Lam et al. | |
| 2009/0024533 A1 | 1/2009 | Fernandes et al. | |
| 2009/0063353 A1* | 3/2009 | Viidu | G06Q 20/401 705/40 |
| 2009/0070263 A1* | 3/2009 | Davis | G06Q 20/322 705/44 |
| 2009/0099961 A1 | 4/2009 | Ogilvy | |
| 2009/0119190 A1 | 5/2009 | Realini | |
| 2009/0157652 A1 | 6/2009 | Barbosa et al. | |
| 2009/0164374 A1 | 6/2009 | Shastry | |
| 2009/0194584 A1 | 8/2009 | Alexander et al. | |
| 2009/0260060 A1 | 10/2009 | Smith et al. | |
| 2009/0266884 A1 | 10/2009 | Killian et al. | |
| 2009/0281817 A1 | 11/2009 | Ferrara et al. | |
| 2009/0288012 A1 | 11/2009 | Hertel et al. | |
| 2009/0299869 A1 | 12/2009 | Cibanof | |
| 2010/0010906 A1 | 1/2010 | Grecia | |
| 2010/0063893 A1 | 3/2010 | Townsend | |
| 2010/0082481 A1* | 4/2010 | Lin | G06Q 20/3278 705/41 |
| 2010/0121745 A1 | 5/2010 | Teckchandani et al. | |
| 2010/0169264 A1 | 7/2010 | O'Sullivan et al. | |
| 2010/0211592 A1 | 8/2010 | Brownlee | |
| 2010/0211938 A1 | 8/2010 | Singh et al. | |
| 2010/0250682 A1 | 9/2010 | Goldberg et al. | |
| 2010/0268648 A1 | 10/2010 | Wiesman et al. | |
| 2010/0280860 A1 | 11/2010 | Iskold et al. | |
| 2010/0312626 A1 | 12/2010 | Cervenka | |
| 2010/0312636 A1 | 12/2010 | Coulter et al. | |
| 2011/0029416 A1 | 2/2011 | Greenspan | |
| 2011/0071892 A1 | 3/2011 | Dickelman | |
| 2011/0078073 A1 | 3/2011 | Annappindi | |
| 2011/0078260 A1 | 3/2011 | Rashad et al. | |
| 2011/0087742 A1 | 4/2011 | Deluca et al. | |
| 2011/0106698 A1 | 5/2011 | Isaacson et al. | |
| 2011/0119190 A1 | 5/2011 | Mina | |
| 2011/0145049 A1 | 6/2011 | Hertel et al. | |
| 2011/0145152 A1 | 6/2011 | McCown | |
| 2011/0177802 A1* | 7/2011 | Gupta | H04L 12/66 455/418 |
| 2011/0178883 A1* | 7/2011 | Granbery | G06Q 20/40 705/16 |
| 2011/0231292 A1* | 9/2011 | McCown | G06Q 20/322 705/26.1 |
| 2011/0238517 A1 | 9/2011 | Ramalingam et al. | |
| 2011/0246284 A1 | 10/2011 | Chaikin et al. | |
| 2011/0251892 A1 | 10/2011 | Laracey | |
| 2011/0313871 A1 | 12/2011 | Greenwood | |
| 2011/0313880 A1 | 12/2011 | Paul et al. | |
| 2012/0024607 A1 | 2/2012 | Swope et al. | |
| 2012/0030091 A1 | 2/2012 | Hu et al. | |
| 2012/0054100 A1 | 3/2012 | Pfohl | |
| 2012/0054102 A1 | 3/2012 | Schwartz et al. | |
| 2012/0095905 A1 | 4/2012 | Hodges | |
| 2012/0130790 A1 | 5/2012 | Lyons et al. | |
| 2012/0130895 A1* | 5/2012 | Granbery | G06Q 20/10 705/44 |
| 2012/0130903 A1 | 5/2012 | Dorsey et al. | |
| 2012/0143753 A1 | 6/2012 | Gonzalez et al. | |
| 2012/0143772 A1 | 6/2012 | Abadir | |
| 2012/0150643 A1 | 6/2012 | Wolfe et al. | |
| 2012/0158553 A1 | 6/2012 | Sudhidhanakul et al. | |
| 2012/0158589 A1 | 6/2012 | Katzin et al. | |
| 2012/0166311 A1 | 6/2012 | Dwight | |
| 2012/0166332 A1 | 6/2012 | Naaman | |
| 2012/0173349 A1 | 7/2012 | Buckley | |
| 2012/0173396 A1 | 7/2012 | Melby et al. | |
| 2012/0185355 A1 | 7/2012 | Kilroy | |
| 2012/0197794 A1 | 8/2012 | Grigg et al. | |
| 2012/0209749 A1 | 8/2012 | Hammad et al. | |
| 2012/0214416 A1 | 8/2012 | Kent et al. | |
| 2012/0239417 A1 | 9/2012 | Pourfallah et al. | |
| 2012/0246074 A1 | 9/2012 | Annamalai et al. | |
| 2012/0246252 A1 | 9/2012 | Denise | |
| 2012/0253852 A1 | 10/2012 | Pourfallah et al. | |
| 2012/0259782 A1 | 10/2012 | Hammad | |
| 2012/0271707 A1 | 10/2012 | Harrison et al. | |
| 2012/0296726 A1 | 11/2012 | Dessert et al. | |
| 2012/0303425 A1 | 11/2012 | Katzin et al. | |
| 2013/0003089 A1 | 1/2013 | Morovic et al. | |
| 2013/0005433 A1 | 1/2013 | Holch | |
| 2013/0006853 A1 | 1/2013 | Amundsen | |
| 2013/0019284 A1 | 1/2013 | Pacyga et al. | |
| 2013/0024506 A1 | 1/2013 | Setton | |
| 2013/0030890 A1 | 1/2013 | Richardson | |
| 2013/0041824 A1 | 2/2013 | Gupta | |
| 2013/0054330 A1 | 2/2013 | O'Donnell et al. | |
| 2013/0060623 A1 | 3/2013 | Walker et al. | |
| 2013/0060708 A1 | 3/2013 | Oskolkov et al. | |
| 2013/0085931 A1* | 4/2013 | Runyan | G06Q 20/325 705/40 |
| 2013/0110656 A1 | 5/2013 | Chau et al. | |
| 2013/0132502 A1 | 5/2013 | Stacey et al. | |
| 2013/0144707 A1 | 6/2013 | Isaacson et al. | |
| 2013/0159081 A1 | 6/2013 | Shastry et al. | |
| 2013/0159173 A1 | 6/2013 | Sivaraman et al. | |
| 2013/0166445 A1 | 6/2013 | Isaacson et al. | |
| 2013/0173407 A1 | 7/2013 | Killian et al. | |
| 2013/0173464 A1 | 7/2013 | Quillian | |
| 2013/0179330 A1 | 7/2013 | Quillian | |
| 2013/0181045 A1 | 7/2013 | Dessert et al. | |
| 2013/0218721 A1 | 8/2013 | Borhan et al. | |
| 2013/0229930 A1 | 9/2013 | Akay et al. | |
| 2013/0232075 A1 | 9/2013 | Monaghan et al. | |
| 2013/0246258 A1 | 9/2013 | Dessert | |
| 2013/0275301 A1 | 10/2013 | Lehman et al. | |
| 2013/0290234 A1 | 10/2013 | Harris et al. | |
| 2013/0297385 A1 | 11/2013 | Mehta et al. | |
| 2013/0316808 A1 | 11/2013 | Nelson et al. | |
| 2013/0317835 A1 | 11/2013 | Mathew | |
| 2013/0317893 A1 | 11/2013 | Nelson et al. | |
| 2013/0325663 A1 | 12/2013 | Scipioni et al. | |
| 2013/0332344 A1 | 12/2013 | Weber | |
| 2013/0332354 A1 | 12/2013 | Rhee et al. | |
| 2013/0339253 A1 | 12/2013 | Sincai | |
| 2014/0006205 A1 | 1/2014 | Berry et al. | |
| 2014/0019341 A1 | 1/2014 | Frohwein | |
| 2014/0025958 A1 | 1/2014 | Calman | |
| 2014/0032297 A1 | 1/2014 | Germann et al. | |
| 2014/0040130 A1 | 2/2014 | Kunz et al. | |
| 2014/0046851 A1 | 2/2014 | Lehman et al. | |
| 2014/0052617 A1 | 2/2014 | Chawla et al. | |
| 2014/0067557 A1 | 3/2014 | Willem et al. | |
| 2014/0074569 A1 | 3/2014 | Francis et al. | |
| 2014/0074658 A1 | 3/2014 | Sanchez | |
| 2014/0074691 A1 | 3/2014 | Bank et al. | |
| 2014/0081783 A1 | 3/2014 | Paranjape et al. | |
| 2014/0089073 A1 | 3/2014 | Jacobs et al. | |
| 2014/0089078 A1 | 3/2014 | Dessert et al. | |
| 2014/0114775 A1 | 3/2014 | Cloin et al. | |
| 2014/0100931 A1 | 4/2014 | Sanchez et al. | |
| 2014/0100973 A1 | 4/2014 | Brown et al. | |
| 2014/0101737 A1 | 4/2014 | Rhee | |
| 2014/0108247 A1 | 4/2014 | Artman et al. | |

(56) References Cited

U.S. PATENT DOCUMENTS

| | | |
|---|---|---|
| 2014/0129942 A1 | 5/2014 | Rathod |
| 2014/0136349 A1 | 5/2014 | Dave et al. |
| 2014/0136352 A1 | 5/2014 | Ramakrishna et al. |
| 2014/0156508 A1 | 6/2014 | Argue et al. |
| 2014/0156517 A1 | 6/2014 | Argue et al. |
| 2014/0164234 A1 | 6/2014 | Coffman et al. |
| 2014/0172531 A1 | 6/2014 | Liberty et al. |
| 2014/0172704 A1 | 6/2014 | Atagun et al. |
| 2014/0180929 A1 | 6/2014 | Ohnishi et al. |
| 2014/0181934 A1 | 6/2014 | Mayblum et al. |
| 2014/0201067 A1 | 7/2014 | Lai et al. |
| 2014/0207679 A1 | 7/2014 | Cho |
| 2014/0214652 A1 | 7/2014 | Zheng et al. |
| 2014/0222595 A1 | 8/2014 | Fernandes |
| 2014/0222663 A1 | 8/2014 | Park et al. |
| 2014/0250002 A1 | 9/2014 | Isaacson et al. |
| 2014/0254575 A1 | 9/2014 | Venkatraman et al. |
| 2014/0279098 A1 | 9/2014 | Ham |
| 2014/0279436 A1 | 9/2014 | Dorsey et al. |
| 2014/0279444 A1 | 9/2014 | Kassemi et al. |
| 2014/0279447 A1 | 9/2014 | Dorsey et al. |
| 2014/0279474 A1 | 9/2014 | Evans et al. |
| 2014/0279556 A1 | 9/2014 | Priebatsch et al. |
| 2014/0304510 A1 | 10/2014 | Sannegowda et al. |
| 2014/0348143 A1 | 11/2014 | Kato et al. |
| 2014/0351130 A1 | 11/2014 | Cheek et al. |
| 2014/0372308 A1 | 12/2014 | Sheets |
| 2015/0012388 A1 | 1/2015 | Kim et al. |
| 2015/0012426 A1 | 1/2015 | Purves et al. |
| 2015/0031393 A1 | 1/2015 | Post et al. |
| 2015/0032567 A1 | 1/2015 | Bhatia |
| 2015/0066765 A1 | 3/2015 | Banks et al. |
| 2015/0073907 A1 | 3/2015 | Purves et al. |
| 2015/0081462 A1 | 3/2015 | Ozvat et al. |
| 2015/0088754 A1 | 3/2015 | Kirsch |
| 2015/0095228 A1 | 4/2015 | Su et al. |
| 2015/0100481 A1 | 4/2015 | Ghosh et al. |
| 2015/0100482 A1 | 4/2015 | Zamer et al. |
| 2015/0120418 A1 | 4/2015 | Cervenka et al. |
| 2015/0134528 A1 | 5/2015 | Fineman et al. |
| 2015/0149350 A1 | 5/2015 | Ananda Kumar et al. |
| 2015/0170092 A1 | 6/2015 | Klein |
| 2015/0178755 A1 | 6/2015 | Barroso |
| 2015/0178835 A1 | 6/2015 | Quillian |
| 2015/0186887 A1 | 7/2015 | Khan et al. |
| 2015/0194023 A1 | 7/2015 | Brackenridge et al. |
| 2015/0287006 A1 | 10/2015 | Hunter et al. |
| 2015/0339696 A1 | 11/2015 | Zhou et al. |
| 2015/0358476 A1 | 12/2015 | Flores-Estrada |
| 2016/0019536 A1 | 1/2016 | Ortiz et al. |
| 2016/0042379 A1 | 2/2016 | Upoli et al. |
| 2016/0048830 A1 | 2/2016 | Laracey |
| 2016/0117670 A1 | 4/2016 | Davis |
| 2016/0125369 A1 | 5/2016 | Grassadonia et al. |
| 2016/0277560 A1 | 9/2016 | Gruberman et al. |
| 2016/0321663 A1 | 11/2016 | Batlle |
| 2017/0287022 A1 | 10/2017 | Capps et al. |
| 2018/0349871 A1 | 12/2018 | Moshal |
| 2020/0160296 A1 | 5/2020 | Park et al. |
| 2021/0117940 A1 | 4/2021 | Grassadonia et al. |
| 2021/0241384 A1 | 8/2021 | Dal et al. |
| 2022/0156707 A1 | 5/2022 | Kumar |
| 2022/0230148 A1 | 7/2022 | Grassadonia et al. |
| 2022/0292472 A1 | 9/2022 | Spindel et al. |
| 2022/0405737 A1 | 12/2022 | McCauley et al. |
| 2023/0196319 A1 | 6/2023 | Ng et al. |

FOREIGN PATENT DOCUMENTS

| | | |
|---|---|---|
| KR | 10-2008-0053056 A | 6/2008 |
| WO | 2011/153281 A2 | 12/2011 |
| WO | 2013/147954 A1 | 10/2013 |
| WO | 2016/069958 A1 | 5/2016 |
| WO | 2023/121756 A1 | 6/2023 |

OTHER PUBLICATIONS

Non-Final Office Action mailed May 13, 2021 for U.S. Appl. No. 14/754,223, of Grassadonia, B., et al., filed Jun. 29, 2015.

Non-Final Office Action mailed Jun. 25, 2021 for U.S. Appl. No. 17/216,385, of McCauley, N., et al., filed Mar. 29, 2021.

Non-Final Office Action mailed Jul. 30, 2021 for U.S. Appl. No. 16/828,817, of Dorsey, J., et al., filed Mar. 24, 2020.

Non-Final Office Action mailed Sep. 16, 2021 for U.S. Appl. No. 17/138,702, of Grassadonia, B., et al., filed Dec. 30, 2020.

Final Office Action mailed Oct. 5, 2021 for U.S. Appl. No. 14/754,223, of Grassadonia, B., et al., filed Jun. 29, 2015.

Final Office Action mailed Nov. 8, 2021, for U.S. Appl. No. 17/216,385, of McCauley, N., et al., filed Mar. 29, 2021.

Notice of Allowance mailed Feb. 4, 2022, for U.S. Appl. No. 17/216,385, of McCauley, N., et al., filed Mar. 29, 2021.

Final Office Action mailed Feb. 7, 2022 for U.S. Appl. No. 17/138,702, of Grassadonia, B., et al., filed Dec. 30, 2020.

Notice of Allowance mailed Feb. 10, 2022 for U.S. Appl. No. 16/828,817, of Dorsey, J., et al., filed Mar. 24, 2020.

Notice of Allowance mailed Feb. 16, 2022 for U.S. Appl. No. 14/754,223, of Grassadonia, B., et al., iled Jun. 29, 2015.

Corrected Notice of Allowability mailed Mar. 2, 2022 for U.S. Appl. No. 14/754,223, of Grassadonia, B., et al., filed Jun. 29, 2015.

Notice of Allowance mailed Mar. 3, 2022 for U.S. Appl. No. 16/828,817, of Dorsey, J., et al., filed Mar. 24, 2020.

Non-Final Office Action mailed Mar. 16, 2022 for U.S. Appl. No. 17/138,702, of Grassadonia, B., et al., filed Dec. 30, 2020.

Notice of Allowance mailed Apr. 13, 2022, for U.S. Appl. No. 17/216,385, of McCauley, N., et al., filed Mar. 29, 2021.

Notice of Allowance mailed Jun. 23, 2022 for U.S. Appl. No. 17/138,702, of Grassadonia, B., et al., filed Dec. 30, 2020.

Ex Parte Quayle mailed Jun. 24, 2022 for U.S. Appl. No. 17/711,364, of Grassadonia, B., et al., filed Apr. 1, 2022.

Corrected Notice of Allowability mailed Jun. 27, 2022, for U.S. Appl. No. 17/216,385, of McCauley, N., et al., filed Mar. 29, 2021.

Notice of Allowability mailed Aug. 17, 2022 for U.S. Appl. No. 17/711,364, of Grassadonia, B., et al., filed Apr. 1, 2022.

Non-Final Office Action mailed Aug. 18, 2022 for U.S. Appl. No. 17/359,237, of Seemann, D., et al., filed Jun. 25, 2021.

Church, K.W., "A stochastic parts program and noun phrase parser for unrestricted text," Proceedings of the second conference on Applied natural language processing, pp. 136-143 (Feb. 9, 1988).

Cover, T. M., and Thomas, J. A., "Elements of Information Theory," John Wiley and Sons, Inc. Publication, New York (1991), pp. 1-140, at http://www.cs-114.org/wp-content/uploads/2015/01/Elements_of_Information_Theory_Elements.pdf. [Part-1].

Cover, T. M., and Thomas, J. A., "Elements of Information Theory," John Wiley and Sons, Inc. Publication, New York (1991), pp. 141-281, at http://www.cs-114.org/wp-content/uploads/2015/01/Elements_of_Information_Theory_Elements.pdf. [Part-2].

Cover, T. M., and Thomas, J. A., "Elements of Information Theory," John Wiley and Sons, Inc. Publication, New York (1991), pp. 282-419, at http://www.cs-114.org/wp-content/uploads/2015/01/Elements_of_Information_Theory_Elements.pdf. [Part-3].

Cover, T. M., and Thomas, J. A., "Elements of Information Theory," John Wiley and Sons, Inc. Publication, New York (1991), pp. 420-563, at http://www.cs-114.org/wp-content/uploads/2015/01/Elements_of_Information_Theory_Elements.pdf. [Part-4].

Derouault, A. M., and Merialdo, B., "Probabilistic grammar for phonetic to French transcription," ICASSP '85, IEEE International Conference on Acoustics, Speech, and Signal Processing, pp. 1577-1580 (1985), at https://ieeexplore.ieee.org/abstract/document/1168078/.

European Patent Office; "EPO Summary of Arguments", Minutes of the Oral Proceedings before the Examining Division; Sep. 22, 2015; Munich, DE.

Magerman, D.M., "Natural Language Parsing as Statistical Pattern Recognition," PHD Thesis, Stanford University, dated Feb. 1994, pp. 1-158.

Magerman, D.M., "Parsing as Statistical Pattern Recognition," IBM T. J. Watson Research Center, dated Jan. 16, 1995, pp. 1-15.

(56) References Cited

OTHER PUBLICATIONS

Gao, J., et al. "A 2D Barcode-Based Mobile Payment System", 2009 Third International Conference on Multimedia and Ubiquitous Engineering, 11 pages (2009).
Nseir, S., et al. "A Secure Mobile Payment System using QR Code", 2013 5th International Conference on Computer Science and Information Technology (CSIT), 4 pages (2013).
Isaac, J.T., et al. "Anonymous Payment in a Client Centric Model for Digital Ecosystems", 2007 Inaugural IEEE International Conference on Digital Ecosystems and Technologies (IEEE DEST 2007), 6 pages.
Yang, Ming-Hour "Security Enhanced EMV-Based Mobile Payment Protocol", Hindawi Publishing Corporation, The Scientific World Journal, vol. 2014, Article ID 864571, 19 pages; http://dx.doi.org/10.1155/2014/864571 (2014).
Non-Final Office Action mailed Jan. 5, 2015 for U.S. Appl. No. 14/284,227, of Wilson, J., et al., filed May 21, 2014.
Final Office Action mailed Jun. 25, 2015 for U.S. Appl. No. 14/284,227, of Wilson, J., et al., filed May 21, 2014.
Non-Final Office Action mailed Feb. 2, 2016, for U.S. Appl. No. 14/754,223, of Grassadonia, B., et al., filed Jun. 29, 2015.
Non-Final Office Action mailed Mar. 24, 2016 for U.S. Appl. No. 14/284,227, of Wilson, J., et al., filed May 21, 2014.
Non-Final Office Action mailed Mar. 25, 2016, for U.S. Appl. No. 14/276,659, of Wilson, J., et al., filed May 13, 2014.
Non-Final Office Action mailed Aug. 11, 2016, for U.S. Appl. No. 14/296,385, of Dorsey, J., et al., filed Jun. 4, 2014.
Final Office Action mailed Aug. 12, 2016, for U.S. Appl. No. 14/754,223, of Grassadonia, B., et al., filed Jun. 29, 2015.
Non-Final Office Action mailed Aug. 30, 2016, for U.S. Appl. No. 14/444,741, of Seemann, D., et al., filed Jul. 28, 2014.
Final Office Action mailed Sep. 29, 2016, for U.S. Appl. No. 14/276,659, of Wilson, J., et al., filed May 13, 2014.
Final Office Action mailed Oct. 6, 2016 for U.S. Appl. No. 14/284,227, of Wilson, J., et al., filed May 21, 2014.
Non-Final Office Action mailed Nov. 18, 2016, for U.S. Appl. No. 14/296,385, of Dorsey, J., et al., filed Jun. 4, 2014.
Advisory Action mailed Dec. 15, 2016, for U.S. Appl. No. 14/754,223, of Grassadonia, B., et al., filed Jun. 29, 2015.
Advisory Action mailed Jan. 12, 2017 for U.S. Appl. No. 14/284,227, of Wilson, J., et al., filed May 21, 2014.
Non-Final Office Action mailed Jan. 20, 2017, for U.S. Appl. No. 14/276,659, of Wilson, J., et al., filed May 13, 2014.
Notice of Allowance mailed May 30, 2017, for U.S. Appl. No. 14/276,659, of Wilson, J., et al., filed May 13, 2014.
Notice of Allowance mailed Jun. 30, 2017, for U.S. Appl. No. 14/284,227, of Wilson, J., et al., filed May 21, 2014.
Final Office Action mailed Jul. 10, 2017 for U.S. Appl. No. 14/296,385, of Dorsey, J., et al., filed Jun. 4, 2014.
Non-Final Office Action mailed Aug. 24, 2017, for U.S. Appl. No. 14/481,760, of McCauley, N.P., et al., filed Sep. 9, 2014.
Final Office Action mailed Oct. 6, 2017, for U.S. Appl. No. 14/444,741, of Seemann, D., et al., filed Jul. 28, 2014.
Non-Final Office Action mailed Mar. 9, 2018, for U.S. Appl. No. 14/754,223, of Grassadonia, B., et al., filed Jun. 29, 2015.
Non-Final Office Action mailed Apr. 26, 2018 for U.S. Appl. No. 14/296,385, of Dorsey, J., et al., filed Jun. 4, 2014.
Final Office Action mailed May 15, 2018, for U.S. Appl. No. 14/481,760, of McCauley, N.P., et al., filed Sep. 9, 2014.
Non-Final Office Action mailed Aug. 10, 2018, for U.S. Appl. No. 14/444,741, of Seemann, D., et al., filed Jul. 28, 2014.
Advisory Action mailed Aug. 27, 2018 for U.S. Appl. No. 14/481,760, of McCauley, N.P., et al., filed Sep. 9, 2014.
Final Office Action mailed Oct. 19, 2018, for U.S. Appl. No. 14/754,223, of Grassadonia, B., et al., filed Jun. 29, 2015.
Final Office Action mailed Dec. 10, 2018, for U.S. Appl. No. 14/296,385, of Dorsey, J., et al., filed Jun. 4, 2014.
Non-Final Office Action mailed May 2, 2019, for U.S. Appl. No. 14/481,760, of McCauley, N.P., et al., filed Sep. 9, 2014.
Final Office Action mailed Jul. 8, 2019, for U.S. Appl. No. 14/444,741, of Seemann, D., et al., filed Jul. 28, 2014.
Non-Final Office Action mailed Oct. 8, 2019, for U.S. Appl. No. 14/754,223, of Grassadonia, B., et al., filed Jun. 29, 2015.
Notice of Allowance mailed Nov. 27, 2019, for U.S. Appl. No. 14/296,385, of Dorsey, J., et al., filed Jun. 4, 2014.
Advisory Action mailed Dec. 4, 2019 for U.S. Appl. No. 14/444,741, of Seemann, D., et al., filed Jul. 28, 2014.
Final Office Action mailed Feb. 4, 2020, for U.S. Appl. No. 14/481,760, of McCauley, N.P., et al., filed Sep. 9, 2014.
Final Office Action mailed Apr. 6, 2020, for U.S. Appl. No. 14/754,223, of Grassadonia, B., et al., filed Jun. 29, 2015.
Advisory Action mailed Jun. 9, 2020 for U.S. Appl. No. 14/754,223, of Grassadonia, B., et al., filed Jun. 29, 2015.
Notice of Allowance mailed Nov. 25, 2020, for U.S. Appl. No. 14/481,760, of McCauley, N.P., et al., filed Sep. 9, 2014.
International Search Report and Written Opinion for International Application No. PCT/US2015/058168, mailed Apr. 12, 2016.
Non-Final Office Action mailed May 12, 2022 for U.S. Appl. No. 17/138,702, of Grassadonia, B., et al., filed Dec. 30, 2020.
Notice of Allowance mailed May 12, 2022, for U.S. Appl. No. 17/216,385, of McCauley, N., et al., filed Mar. 29, 2021.
Notice of Allowance mailed Jul. 7, 2022 for U.S. Appl. No. 17/138,702, of Grassadonia, B., et al., filed Dec. 30, 2020.
Non-Final Office Action mailed Jul. 14, 2022 for U.S. Appl. No. 14/754,223, of Grassadonia, B., et al., filed Jun. 29, 2015.
Corrected Notice of Allowability mailed Jul. 11, 2022, for U.S. Appl. No. 17/216,385, of McCauley, N., et al., filed Mar. 29, 2021.
Non-Final Office Action mailed Sep. 28, 2022 for U.S. Appl. No. 29/831,541, of Grassadonia, B., et al., filed Mar. 21, 2022.
Money Transfer to East Africa—Omondi, https://innov8tiv.com/money-transfer-east-africa-just-got-lot-easier-thanks-wave/ (Year:2015).
American Express Launches Serve, a Direct Mobile Payment App—Sage, https://www.intomobile.com/2011/03/28/american-express-launches-serve-a-direct-mobile-to-mobile-payment-app/ (Year: 2011).
Blank Check with Open Space—iqoncept, https://depositphotos.com/5777799/stock-photo-blank-check-with-open-space.html (Year: 2011).
Dads dig this Venmo app—Venmo, https://coolmomtech.com/2014/05/venmo-app-ios-android/ (Year: 2014).
Square Cash for iOS Lets You Pay Friends Over Bluetooth—TNW, https://thenextweb.com/news/sq uare-cash-ios-how-lets-select-pay-nearby-friends-usi ng-bluetooth-low-energy (Year: 2014).
Notice of Allowability mailed Aug. 23, 2022 for U.S. Appl. No. 14/754,223, of Grassadonia, B., et al., filed Jun. 29, 2015.
Corrected Notice of Allowability mailed Sep. 16, 2022 for U.S. Appl. No. 14/754,223, of Grassadonia, B., et al., filed Jun. 29, 2015.
"Adyen Announces European Availability of Chip & PIN Mobile Point-of-Sale Solution," Business Wire, dated Dec. 3, 2012, retrieved from: https://www.businesswire.com/news/home/20121203005476/en/Adyen-Announces-European-Availability-Chip-PIN-Mobile, pp. 1-4.
"Divvy makes splitting the check as easy as snap, drag, and pay", Divvy App Website, published on May 11, 2013, retrieved from: http://web.archive.org/web/20130511015727/http://divvythatup.com/, on Sep. 6, 2017, pp. 1-2.
"MeDeploy Launches a New Approach to Digital Pay-Media Distribution at DEMOfall 08", Science Letter, published on Sep. 23, 2008, pp. 1-2.
"Tab: A Seriously Useful Bill-Splitting App", The Huffington Post, published on Aug. 27, 2013, retrieved from: http://www.huffingtonpost.com/2013/08/27 /bill-splitting-app-tab_n_3818225.html>, on Sep. 6, 2017, pp. 1-2.
"White Paper Near Field Communication", NOKIA, 2007, pp. 1-4.
Gneezy et al. "The inefficiency of splitting the bill", The Economic Journal, vol. 114, Apr. 2004, pp. 265-280.
Nagasubramanian et al., "Online Payment- Innovation in Split Tender Payment", International Journal of Computer Applications, vol. 55, No. 10, Oct. 2012, pp. 35-41.
"Manage housemate expenses with Conmigo for Android | How To—CNET", May 21, 2012, pp. 1-12.

(56) References Cited

OTHER PUBLICATIONS

Ho A., "No more deadbeat friends: PayDivvy launches social bill service | VentureBeat", Year 2011, 5 pages.

* cited by examiner

PROXIMITY-BASED PAYMENTS

CROSS-REFERENCE TO RELATED APPLICATIONS

This application is a continuation under 35 U.S.C. § 120 of U.S. application Ser. No. 16/828,817, filed Mar. 24, 2020, which is a continuation under 35 U.S.C. § 120 of U.S. application Ser. No. 14/296,385, filed Jun. 4, 2014, now U.S. Pat. No. 10,614,445 entitled "PROXIMITY-BASED PAYMENTS," which is incorporated by reference in its entirety herein.

BACKGROUND

Financial transactions are a crucial part of our everyday lives. On one end, there are financial transactions between merchants and customers. On the other end, there are financial transactions between customers. When two or more customers want to share the cost of a purchase, apportioning the cost between them can be difficult, especially when one or more of them want to pay by credit card. Consider, for example, the situation in which a social group gathers for a meal at a restaurant, where everyone is to pay for his or her own food and drink. When it comes the time to pay the check, the need of conducting payment from one party to another can create an inconvenient and sometimes awkward interruption in the social interaction of the group. When there is not enough cash in the social group to settle the bill, many customers also find annoying the need to remember and track down how much each party owes to another.

BRIEF DESCRIPTION OF THE DRAWINGS

One or more embodiments of the present invention are illustrated by way of example and not limitation in the figures of the accompanying drawings, in which like references indicate similar elements.

FIGS. 8A-8G illustrate examples of various screen displays that can be generated by a mobile payment application on a customer's mobile device to enable proximity-based payment.

DETAILED DESCRIPTION

Figure 1:
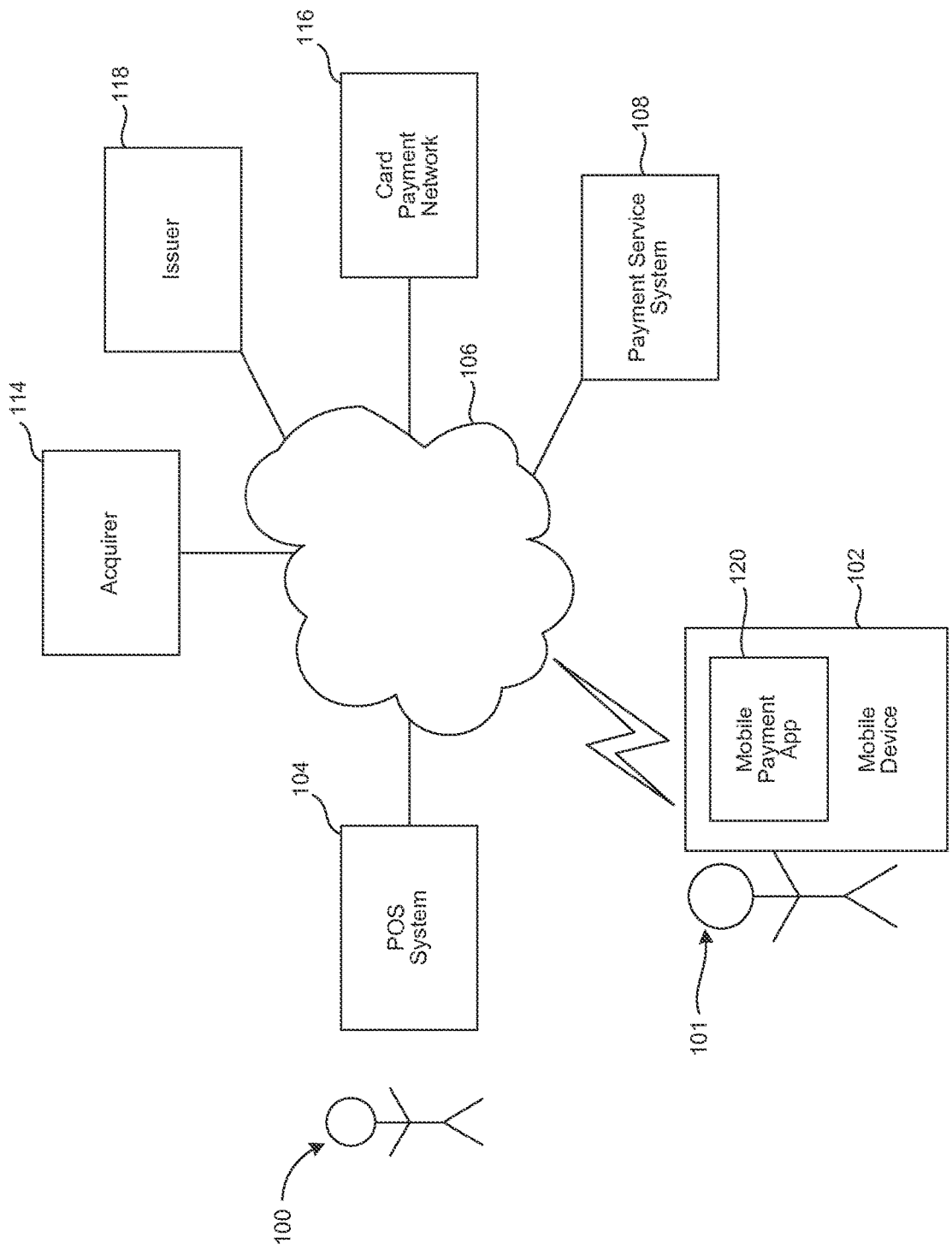
FIG. 1 illustrates an environment within which the proximity-based payment techniques introduced here can be implemented.

References in this description to "an embodiment," "one embodiment," or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

It is observed that the aforementioned need of conducting payment from one party to another often arises in social gatherings and can create annoyance. There are traditional ways of handling this kind of situation. For example, in one common approach, one member of the group uses a credit card, and the other members of the group reimburse that person with cash for their portions. With this approach, it is inconvenient and often time-consuming to have to calculate how much each person (or each couple or family) owes and then collect cash from the other members of the group. Additionally, it is common that some members of the group end up paying more or less than their fair share. In another common approach, the group asks the waiter to split the check in a certain manner, and everyone then either pays cash or uses his or her own credit card. This approach can also be troublesome if the check is not being split equally, and regardless, it is inconvenient and time-consuming for the waiter. In any of these situations, the need to deal with these issues detracts from the social atmosphere of the event.

To service non-sophisticated consumers, payment from one party to another should remain simple and easy to execute. Introduced here are techniques that facilitate customers' mobile devices to conduct proximity-based payments, which can further reduce the friction of conducting payments from one party to another. In the social dinning example discussed above, the techniques introduced here enable a customer (or a consumer, as used interchangeably herein) to pay another customer easily by using the customer's mobile device (e.g., a smartphone or tablet computer).

In short, the techniques involve communication among a mobile payment application installed on the customer's mobile device and a remote payment service system (PSS) (more of which is discussed below). The mobile payment application running on the customer's mobile device detects physical proximity of other customers' mobile devices, and enables the user to specify to whom and how much payment should be made. The mobile payment application communicates this information to the PSS, which then executes or triggers execution of the transfer of funds to carry out the specified payment. In some embodiments, the communication to the PSS enables the PSS to look up additional contact information; then, in certain examples, the PSS can transmit the additional contact information to the mobile payment application so that the payment transfers can be more easily facilitated (e.g., by automatically entering, for the user, those additional information of those customers who are physically nearby the user).

As described further below, mobile devices implementing the techniques disclosed herein can detect another device (or devices) that is close by and conduct payments. In certain embodiments, the techniques introduced here can utilize wireless personal area network (WPAN) circuitry (e.g., Bluetooth, Bluetooth Low Energy (BLE), Infrared Data Association (IrDA), etc.) that is equipped on a mobile device to determine whether there is another mobile device that is within the network and, in some examples, how close the another mobile device is. Preferably using his or her mobile devices, a customer user who wishes to enjoy the proximity-based payment functionality sets up the functionality by entering information about the customer's financial account (e.g., debit card information). For example, the customer enters the financial information in the customer's mobile device, and the customer's mobile device uploads to the PSS the financial account information together with an identifier that uniquely identifies the mobile device (such as an International Mobile Station Equipment Identity (IMEI) code or a BLE identifier (BLE ID)) so that the customer's mobile device is associated with the financial account.

When there is another mobile device detected in the network, the mobile device verifies whether the detected mobile device wishes to participate in proximity-based payments (i.e., allowing other mobile devices to conduct proximity-based payments with it). If the mobile device finds that the detected device also has proximity-based payment functionality enabled, then the mobile device prompts the customer to select the detected device for conducting a payment. For example, the mobile device can display icons or names that are representative of all the detected devices nearby that have their proximity-based payment functionalities enabled. As is described in fuller detail below, the devices nearby can have ways to control whether to be detected by the mobile device, and if so, in what manner they are to be displayed. The payment either can be sending from the customer's mobile device to the detected device, or can be receiving from the detected device to the customer's mobile device.

Upon the customer's selection of the detected device, the customer's mobile device can ask the customer to enter or to confirm an amount for the payment. Then, if the payment is from the customer's device to the detected device, the customer's device can cause the amount of payment to be transferred from the financial account associated with the customer's device to the financial account associated with the detected device. In variations, this process can also be initiated when the customer's device receives a request (or invitation) for payment from the detected device. On the other hand, if the payment is from the detected device to the customer's device, the customer's device can send out a request or invitation for payment to the detected device.

The techniques introduced here enable one customer to pay another quickly and easily compared to traditional methods. Furthermore, without the prerequisites of a customer having any information (e.g., an email address or a phone number) about another, the introduced techniques enable users to conduct payments with each other as long as they are in physical proximity, thereby greatly reducing the potential for awkward interruptions to the social flow of group events due to bill splitting issues, even in group events that include multiple distinct social circles. The introduced techniques are also advantageous over several traditional means of providing direct payment between two parties, such as an Automated Clearing House (ACH) network. In particular, the ACH is an electronic network for financial transactions in the United States and enables credit transfers including direct deposit, but the ACH would require a trial deposit of a trivial amount (e.g., $1) to verify the financial account, the process of which may take days. Indeed, traditional ways of direct monetary transfer from one bank account to another often involve time-consuming verification processes, which may reduce or even defeat the convenience that the techniques introduced here aim to bring.

In the following description, the example of a social dinning event is used, for illustrative purposes only, to explain various aspects of the techniques. Note, however, that the techniques introduced here are not limited in applicability to dinning in restaurants or to any other particular kind of scenario. Additionally, although the following description adopts debit cards as an example for the financial account information, the techniques introduced here are not limited to use with debit cards or other types of payment cards; rather, the techniques can be employed with essentially any suitable financial account that traditionally would be involved in monetary transfers. Additionally, the term "sale," as in point-of-sale (POS), refers to any type of payment-oriented transaction, including providing of a service, a lease or rental for example, and is not limited to an actual purchase. Note also that in this description, the term "user" generally refers to a consumer or a customer (as opposed to a merchant), except where otherwise indicated, and except that the term "user interface" does not necessarily refer to an interface used by a customer, as will be apparent from the context.

Additionally, while the customer generally uses a mobile device to conduct proximity-based payments in the embodiments emphasized herein, in other embodiments the consumer may use a processing device other than a mobile device to specify that information, such as a conventional personal computer (PC). In such embodiments, the mobile payment application can be replaced by a more conventional software application in such processing device, where such software application has functionality similar to that of the mobile payment application as described herein.

FIG. 1 illustrates an environment within which the proximity-based payment techniques introduced here can be implemented. The environment includes a mobile device 102 of a user 101 (also referred to as "customer" or "consumer"). Optionally, the environment can further include a merchant POS system of a merchant 100. The mobile device 102 can be, for example, a smart phone, tablet computer, notebook computer, or any other form of mobile processing device. In some implementations, a mobile payment application 120 can run on the user's mobile device 102 to interact with other components in the environment; for example, in one embodiment, the mobile payment application 120 can receive a digital version of a transaction receipt from the merchant. The environment also includes a computer system 114 of the merchant's acquirer, a computer system 118 of an issuing bank, a computer system 116 of a card payment network, and a computer system 108 of a payment service (hereinafter "payment service system (PSS) 108"). Each of the aforementioned computer systems can include one or more distinct physical computers and/or other processing devices which, in the case of multiple devices, can be connected to each other through one or more wired and/or wireless networks. All of the aforementioned devices are coupled to each other through an internetwork 106, which can be or include the Internet and one or more wireless networks (e.g., a wireless local area network (WLAN) and/or a cellular telecommunications network).

In a traditional credit card transaction, the merchant swipes the user's credit card through a card reader at the merchant's POS system 104. The POS system 104 sends data read from the card (e.g., the cardholders name, credit card number, expiration date and card verification value (CVV)) to the computer system 114 of the merchant's acquirer (hereinafter "acquirer 114"). The acquirer 114 sends this data to the computer system 116 of the card payment network (e.g., Visa or MasterCard) (hereinafter "card payment network 116"), which forwards the data to the computer system 118 of the issuing bank (hereinafter "issuer 118"). If the transaction is approved by the issuer 118, a payment authorization message is sent from the issuer 118 to the merchant POS system 104 via a path opposite of that described above.

Figure 2:
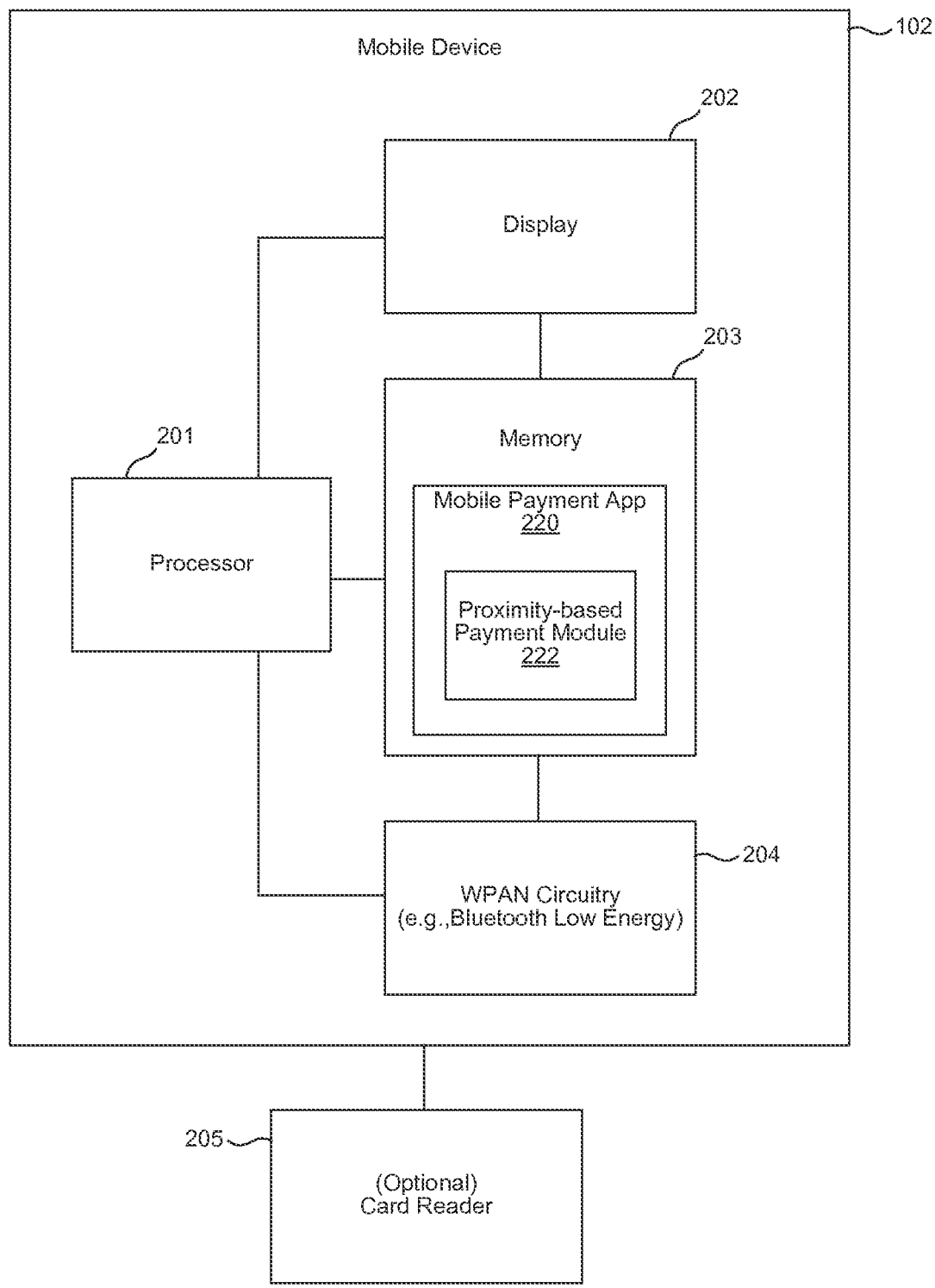
FIG. 2 illustrates an example of a mobile device implementing one or more techniques disclosed herein.

FIG. 2 illustrates an embodiment of the user's mobile device 102 implementing one or more techniques disclosed herein. Note that the components shown in FIG. 2 are merely illustrative; certain components that are well known are not shown for simplicity. Referring to FIG. 2, the mobile device 102 includes a processor 201, a memory 203 and a display 202. The mobile device 102 also includes a wireless personal area network (WPAN) circuit 204, and optionally, a card reader 205. The processor 201 can have generic characteristics similar to general purpose processors or may be application specific integrated circuitry that provides arithmetic and control functions to the mobile device 102. The processor 201 can include a dedicated cache memory (not shown for simplicity). The processor 201 is coupled to all modules 202-205 of the mobile device 102, either directly or indirectly, for data communication.

The memory 203 may include any suitable type of storage device including, for example, an SRAM, a DRAM, an EEPROM, a flash memory, latches, and/or registers. In addition to storing instructions which can be executed by the processor 201, the memory 203 can also store data generated from the processor module 201. Note that the memory 203 is merely an abstract representation of a generic storage environment. According to some embodiments, the memory 206 may be comprised of one or more actual memory chips or modules. The display 202 can be, for example, a touchscreen display, or a traditional non-touch display (in which case the mobile device 102 likely also includes a separate keyboard or other input devices). Optionally, the mobile device 102 can include or be coupled to a card reader 205, which can be any suitable physical card reader that can read a physical card, such as a magnetic stripe card reader, an optical scanner, a smartcard reader, a radio frequency identification (RFID) reader, or the like.

The WPAN circuitry 204 is wireless communication circuitry that can form and/or communicate with a computer network for data transmission among electronic devices such as computers, telephones, and personal digital assistants. WPANs can be used for communication among the personal devices themselves or for connecting to a higher level network (e.g., a WLAN) and the Internet. Some examples of the WPAN circuitry 204 include IrDA, Bluetooth (including aforementioned BLE), Z-Wave, ZigBee, Body Area Network, and so forth. In some embodiments, the WPAN circuitry 204's connection can be bootstrapped by a near field communication (NFC) connection.

A mobile payment application 220 may be or include a software application, as henceforth assumed herein to facilitate description. As such, the mobile payment application 220 is shown as being located within the memory 203. Alternatively, the mobile payment application 220 could be a hardware or a firmware component (which may include a mobile payment software application).

In accordance with some embodiments of the techniques introduced here, the mobile payment application 220 includes a proximity-based payment module 222 that implements the techniques introduced here and provides proximity-based payment functionalities to the mobile device 102. The proximity-based payment (PBP) module 222 communicates with the mobile payment application 220. The PBP module 222 may also communicate with the display 202, either directly or through the mobile payment application 220. Similar to the mobile payment application 220, the PBP module 222 can be software, hardware, or a combination thereof. As illustrated in FIG. 2, the PBP module 222 can be an integral part of the mobile payment application 220. Alternatively, although not shown in FIG. 2 for simplicity, the PBP module 222 can be logically separate from the mobile payment application 220 but operate "alongside" it (such as the case of having two separate mobile software applications installed on the mobile device 102). Further details on how various embodiments of the proximity-based payment module 222 operate in implementing the proximity-based payment techniques disclosed here are discussed below.

In some embodiments, the mobile application 220 can employ a number of techniques for simplifying customer-to-customer transactions by use of an email mechanism. Some examples of these techniques are discussed in U.S. patent application Ser. No. 14/246,017, entitled "PAYMENT TRANSFER BY SENDING EMAIL," filed Apr. 4, 2014, which is assigned to the same assignee as the present application. In general, these techniques enable a simplified payment transaction system for ordinary consumers without the hassle of having to sign up, to remember a user account associated with a password, and to login for sending or receiving every payment transaction, while not sacrificing the essential security feature of authenticating the user for every payment transaction. To send a payment, the user needs to only specify a receiver email address in an email. When the payment email is created, the email can be auto-populated with a security token. The email can also carbon copy (Cc), blind carbon copy (Bcc), or add as a recipient (To) a payment processing email address. When the email is sent, the payment processing system 108 can receive the payment email (e.g., by receiving the payment email through the payment processing email address) and generate a payment receipt interface for the receiver of the email.

Although these embodiments of the mobile application 220 can provide easy execution of customer-to-customer financial transactions (e.g., payment transfers), it is observed here that the above-described process can be even further simplified if the requirement for identifying the email addresses of the receivers (or payers, whichever the situation may be) can be removed. Accordingly, by one or more techniques discussed here, the proximity-based payment module 222 provides the mobile payment application 220 the ability to identify another customer that is nearby, and the ability to automatically enter contact information (e.g., email) of the identified, nearby customer for payment transaction, such that interruption caused by payment transfers to the flow of a social event (e.g., asking another customer for his or her email address) can be further reduced. More implementation details of the proximity-based payment module 222 is discussed blow.

Figure 3:
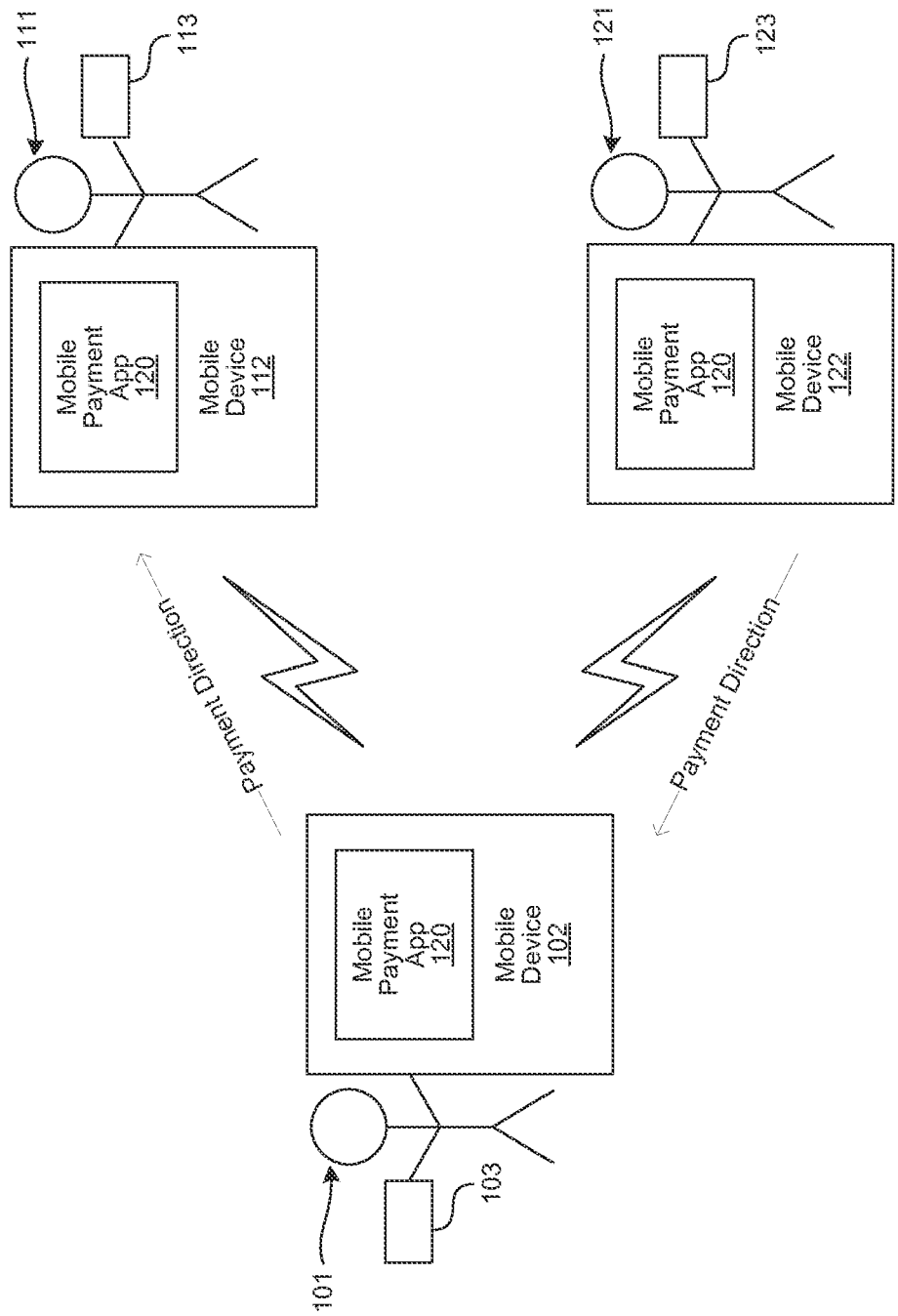
FIG. 3 illustrates an example of proximity-based payments being conducted by a customer's mobile device with other customers' mobile devices.
Figure 4:
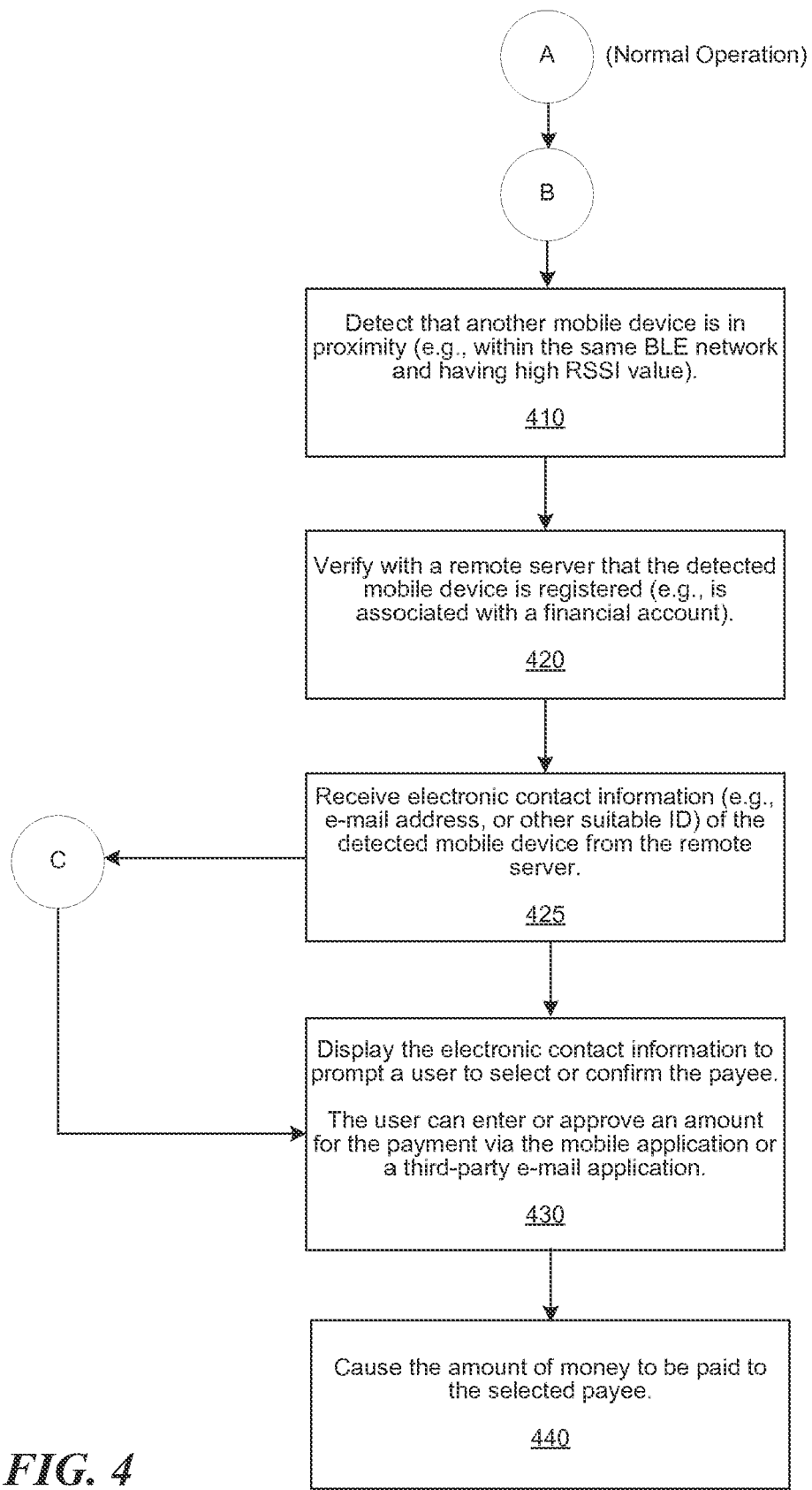
FIG. 4 is a flow diagram illustrating an example of a process for conducting proximity-based payments between mobile devices.
Figure 5:
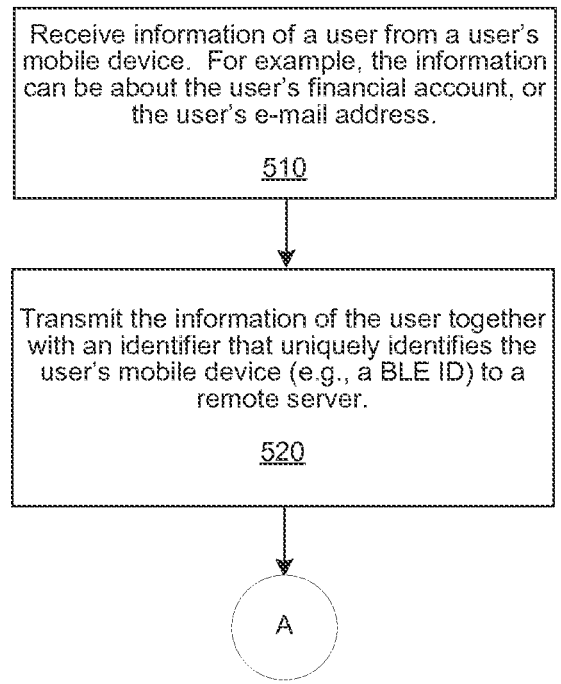
FIGS. 5-6 are two flow diagrams illustrating optional features which can be implemented with the example process of FIG. 4, in accordance with some examples.
Figure 6:
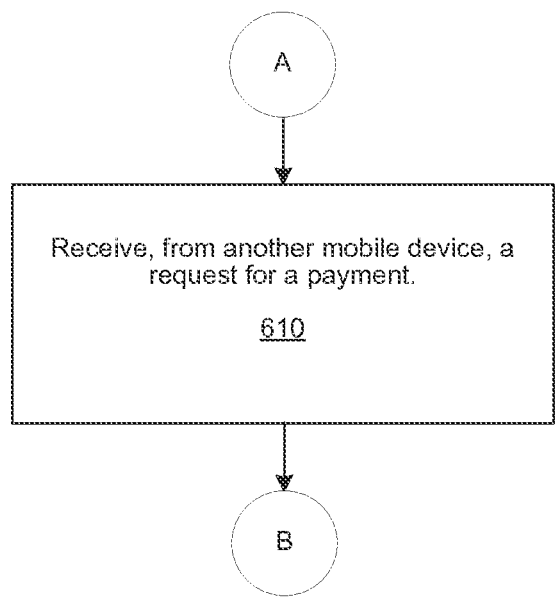
Figure 7:
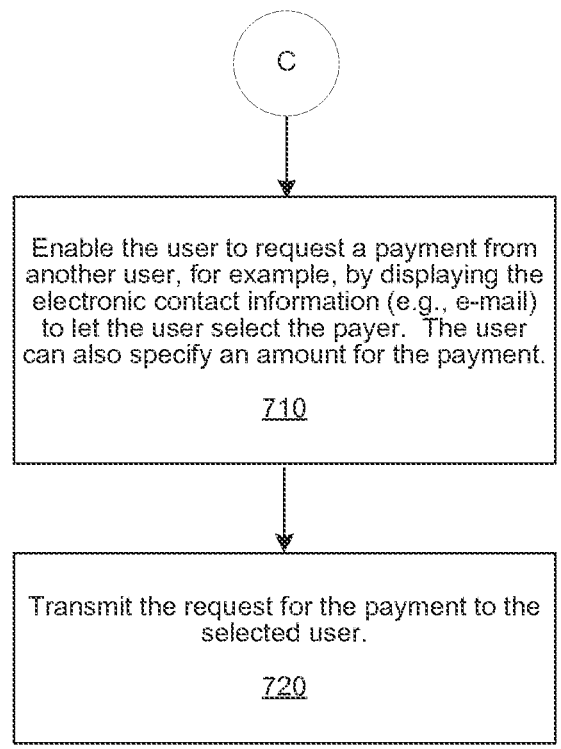
FIG. 7 is a flow diagram illustrating an example of an additional or alternative process for conducting proximity-based payments between mobile devices.

FIG. 3 illustrates an example of proximity-based payments being conducted by a customer's mobile device 102 with other customers' mobile devices 112 and 122. FIGS. 4-7 are flow diagrams illustrating various examples of a process (e.g., to be executed by the mobile payment application 120) for conducting proximity-based payments among mobile devices 102, 112, and 122. FIGS. 8A-8G illustrate examples of various screen displays that can be generated by a mobile payment application on a customer's mobile device to enable proximity-based payment. For purposes of illustration, the process of FIGS. 4-7 is explained with reference to certain elements illustrated in FIG. 3.

As illustrated in FIG. 3 and continuing with the above social dinning example, users 111 and 121 are in proximity with the user 101 after the dinning and would like to settle the bill. For example, the user 101 needs to make payment to user 111 and also needs to receive payment from user 121.

In preferred embodiments, before the user 101 can pay the user 111, the user 101 enables the proximity-based payment functionality in the mobile payment application 120 by entering information about a financial account of the user 101. For example, the user 101 enters information about his or her debit card 103 (e.g., through the card reader 205 or other input devices present on the mobile device 102) into the mobile payment application 120. After the mobile payment application 120 receives (510) the information about the financial account, the application 120 transmits (520) the information entered by the user 101 together with an identifier that uniquely identifies the mobile device 102 to a remote server (e.g., the PSS 108) so that the mobile device 102 is associated with the user 101's financial account (as indicated by the card 103). For example, the identifier can be the IMEI code of the mobile device 102. In one embodiment, the identifier is a BLE ID, a unique ID identifying each and every BLE chip. The transmission from the application 120 to the PSS 108 can be encrypted.

Note that, although a debit card is used for purposes of explaining the present techniques, the card 103 is not limited to an actual card of such kind; in alternative examples, the card 103 can represent an online bank account or any suitable payment account that can be used by the user 101 to transfer and/or receive currency. Further, in some embodiments, one mobile device can be associated with more than one financial accounts; in these embodiments, the mobile payment application 120 can adapt well-known multi-account managing techniques that allow the user 101 to identify which financial account should be used for conducting proximity-based payments. As an alternative, the user 101 can enter his or her financial account information along with the identifier that uniquely identifies the device 102 directly onto the PSS 108 (e.g., via a webpage that the PSS 108 hosts). In this alternative case, the PSS 108 can separately verify the correctness of the received information (e.g., by sending a text message to the mobile device 102). In other embodiments, the user 101 can associate the mobile device 102 and/or his particular instance of the mobile application 120 by registering (e.g., his email address) with the PSS 108.

Additionally or alternatively, the user 101 can enter other contact or identification information into the mobile payment application 120. Similar to the aforementioned financial account information, these contact or suitable identification information of the user 101 can be communicated to the PSS 108 so that these information can be associated to the mobile device 102. For example, in certain implementations where the mobile payment application 120 can initiate or cause proximity-based payment transaction by use of emails, the user 101 should enter his or her email address so that the PSS 108 can have the email address as one of the mechanisms available for identifying the mobile device 102. Note that, in some these examples that can cause payment transfers using email, the financial account information (e.g., the debit card information) need not be entered into the PSS 108—the email address can be used for payment transfers instead.

Similar to how the user 101 enables the proximity-based payment functionality by associating the mobile device 102 with the debit card 103, the users 111 and 121 each enable the proximity-based payment functionality on their mobile payment applications 120 by respectively associating the mobile device 112 with the debit card 113, and the mobile device 122 with the debit card 123. For certain implementations where the mobile payment application 120 can initiate proximity-based payment transaction by utilizing emails, the users 111 and 121 each should enter their email addresses into their respective mobile payment applications 120.

During normal operation, the mobile device 102 can conduct proximity-based payments with the mobile device 112 by first detecting (410) that the mobile device 112 is within the wireless network, such as within range of a BLE network. The detection can be initiated, in one example, when the user 101 selects to activate the mobile application 120 on the device 102, or in another example, when the user 101 selects to switch the mobile application 120 to run in foreground. More specifically, the mobile device 112 can sense the BLE devices (e.g., the device 112) that are nearby using BLE proximity sensing, e.g., estimating physical proximity using the radio receiver's received signal strength indication (RSSI) value. In other examples, the mobile application 120 may invoke other types of short-range wireless communication feature of the mobile device 102, such as infrared communication, WiFi, or the like.

To balance security, privacy, and convenience, a mobile device can choose (e.g., by turning off a particular WPAN circuit, by closing the mobile software application 120, or by refusing to be connected for proximity-based payment) whether it can be detected by other mobile devices within the network.

Depending on the implementation, some embodiments of the mobile payment application 120 only allows a mobile device to be discoverable when an instance of the mobile payment application 120 is running; for example, some embodiments of the application 120 allow proximity-based payment only when they are operating in the foreground, and some other embodiments of the application 120 allow proximity-based payment regardless of whether they are operating in the foreground or the background. Additionally or alternatively, the mobile payment application 120 can require a password before another mobile device attempts to detect or connect for proximity-based payment purposes. The password that authenticates a first mobile device (e.g., device 102) to conduct proximity-based payments with a second mobile device (e.g., device 112) is designated by a user of the second mobile device. The password protection is preferred in some implementations of the mobile payment application 120 which can remain in the background and broadcast about its capability to conduct proximity-based payment.

In some embodiments, a user can select to accept or refuse to conduct proximity-based payment with some particular mobile devices but not others. In these embodiments, the mobile payment application 120 of the mobile device 102, for example, can send out a query to the mobile payment application 120 of the mobile device 112, and the mobile device 112 can send out a signal (e.g., in response to the query) indicating whether the mobile device 112 allows conducting payments with the mobile device 102. In one example, the mobile device 102 also measures a received signal strength of a beacon signal sent from the mobile device 112, and the mobile device 112 is only considered detected when the received signal strength of the beacon signal sent from the mobile device 112 exceeds a predetermined threshold, i.e., when the mobile device 112 is close enough. In variations, the user can approve a nearby mobile device for a one-time-only proximity-based payment.

In addition or as an alternative to aforementioned ways of directly detecting proximity of other devices, the mobile payment application 120 of the mobile device 102 can indirectly detect the physical proximity of the mobile devices (e.g., device 112). In one example, even though the two devices (e.g., device 102 and 112) may not be within the same wireless network (e.g., a BLE network), the two devices can individually and separately determine their locations and transmit their locations back to the PSS 108, which can in turn determine that the two devices are in physical proximity for conducting proximity-based payments. How each device can determine its own physical location can be achieved through various means, for example, location calculation based on a global positioning satellite receiver, or triangulation from a number of nearby wireless base stations.

In this way, the mobile device 102 can identify, among the nearby devices within the wireless network, which devices are suitable candidates for conducting proximity-based payments by detecting, for example, which devices have their mobile payment application 120 up and running and with strong BLE signals. These features and options can also be adjusted depending on the user's preference in one or more embodiments.

Referring back to FIG. 3, after the mobile device 112 is detected by the mobile device 102, the mobile device 102 verifies (420) with the PSS 108 that the mobile device 112 is eligible for proximity-based payment; that is to say, the mobile device 102 verifies (420) with the PSS 108 that the user 111 has completed the aforementioned card association process and that the mobile device 112 is indeed associated with the card 113. Specifically, in at least those embodiments which employ BLE for conducting proximity-based payments, the mobile device 102 receives an identifier that uniquely identifies the mobile device 112 during the detection phase. As such, the mobile device 102 can verify with the PSS 108 by transmitting the identifier received from the mobile device 112 to the PSS 108 to ascertain the mobile device 112's eligibility for conducting proximity-based payments.

Figure 8A:
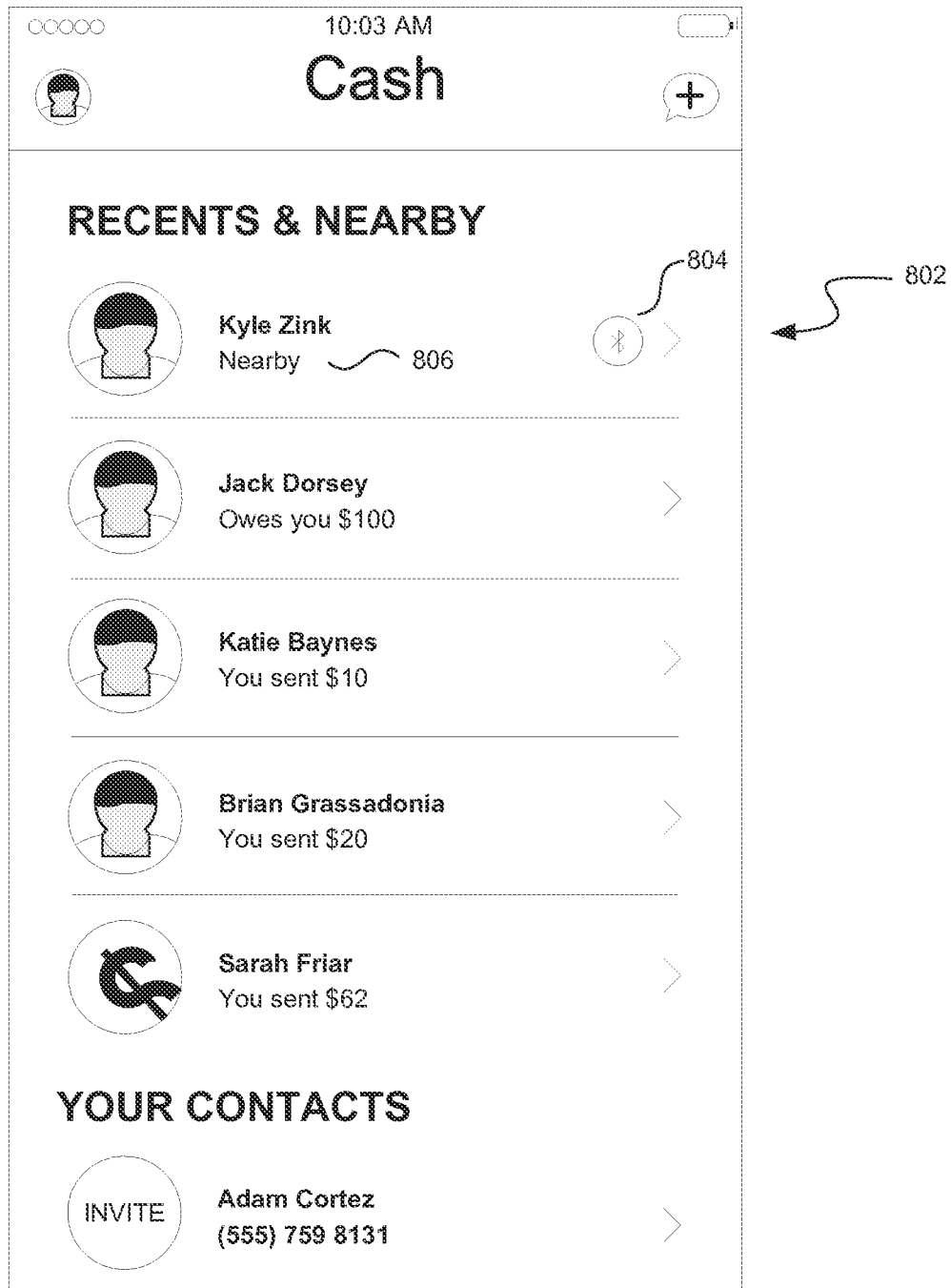
Figure 8B:
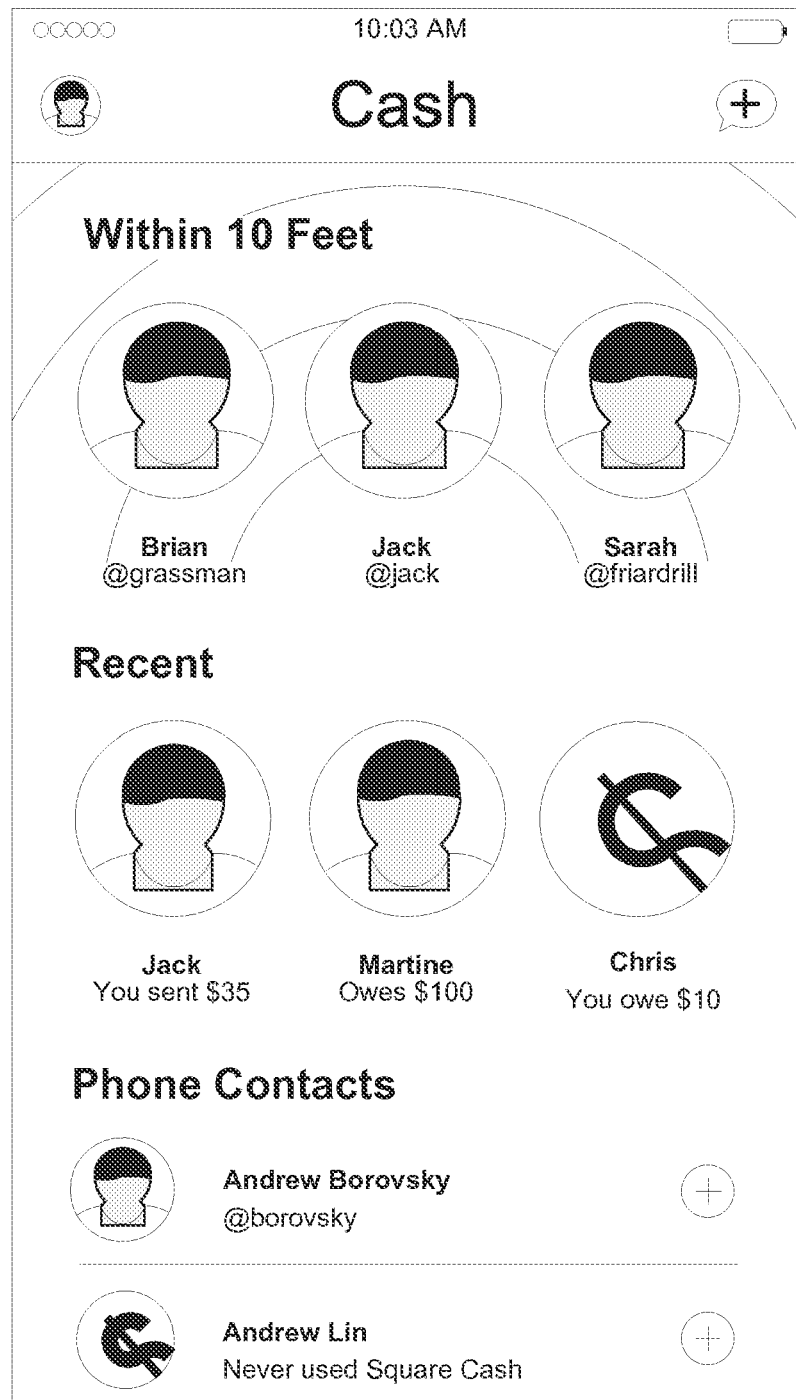
Figure 8C:
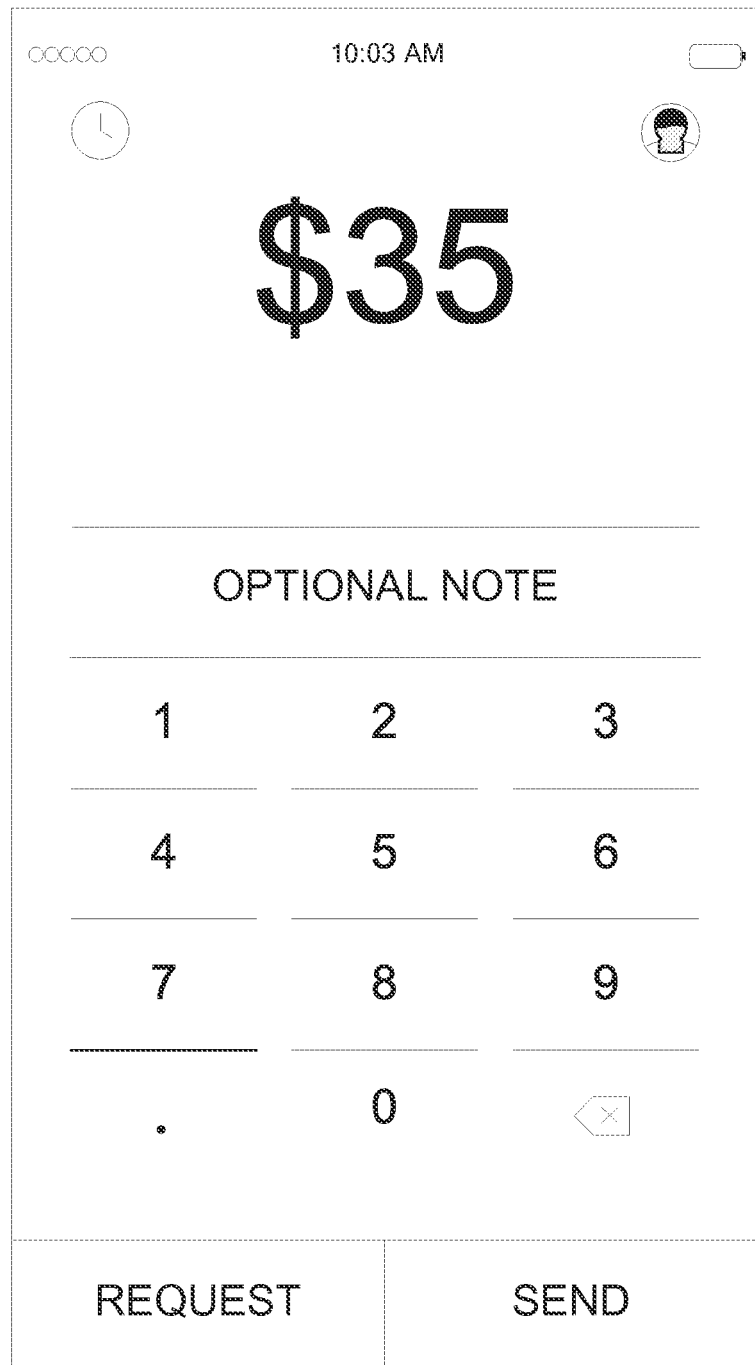
Figure 8D:
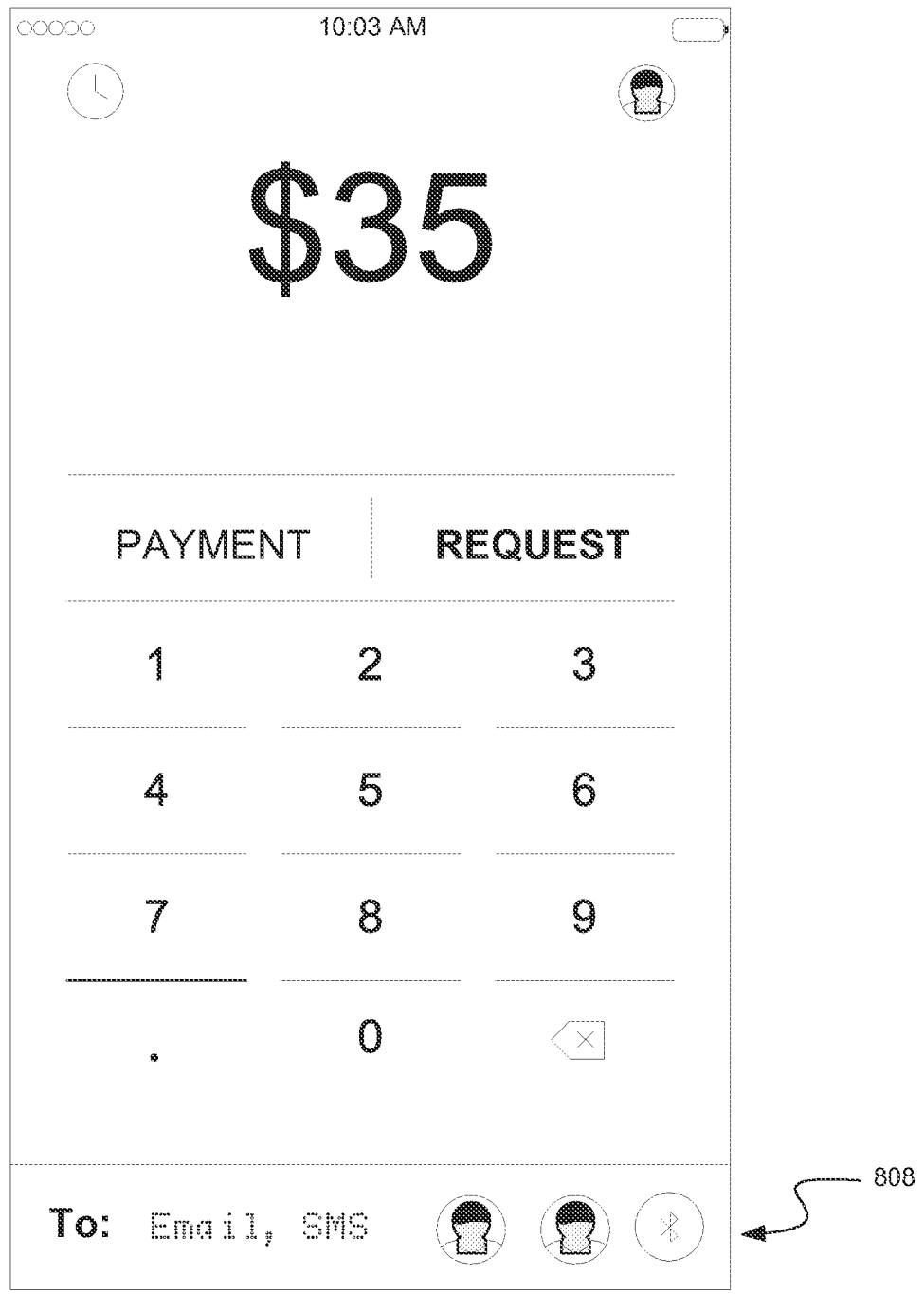
Figure 8E:
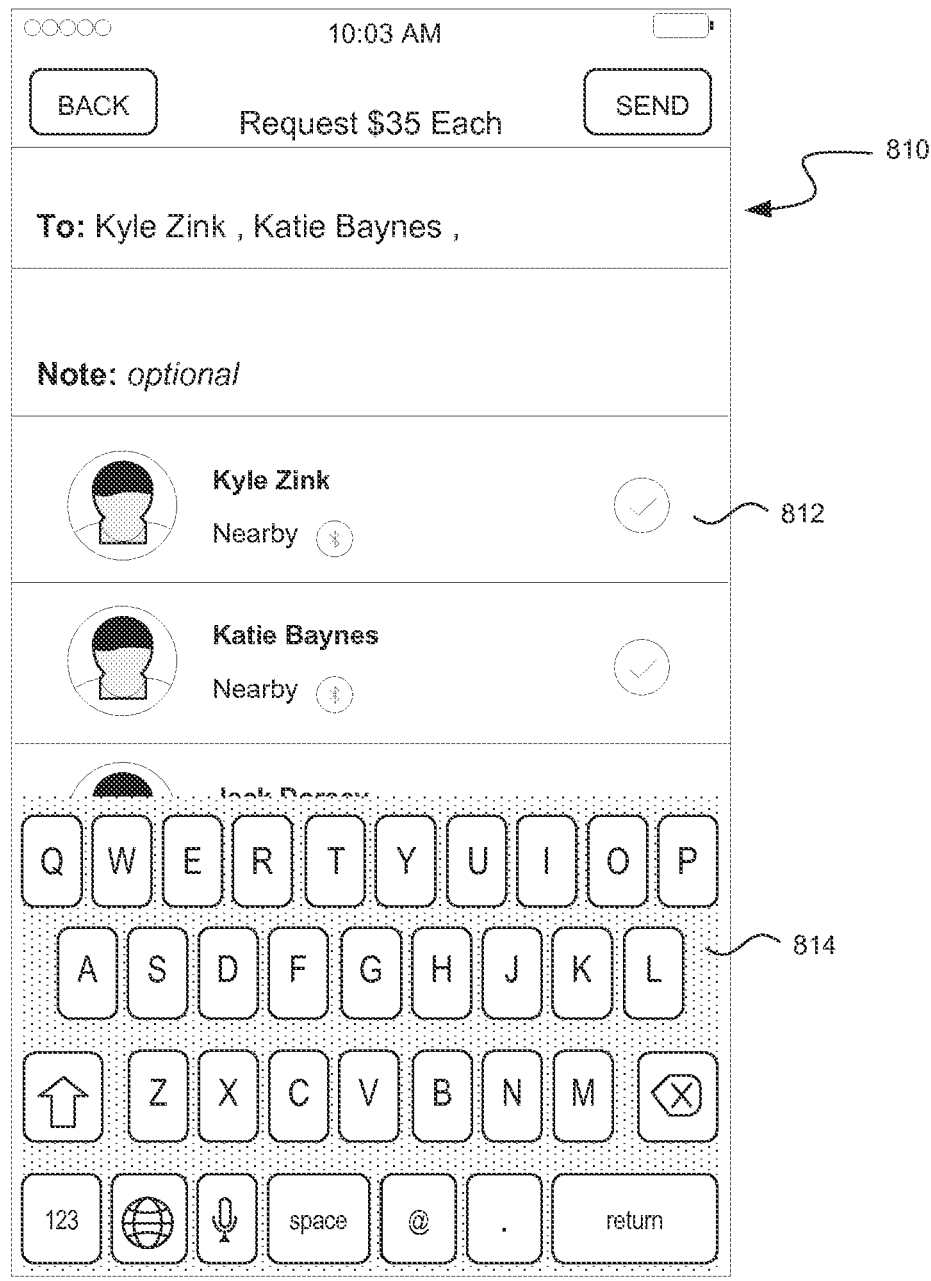
Figures 8F, 8G:
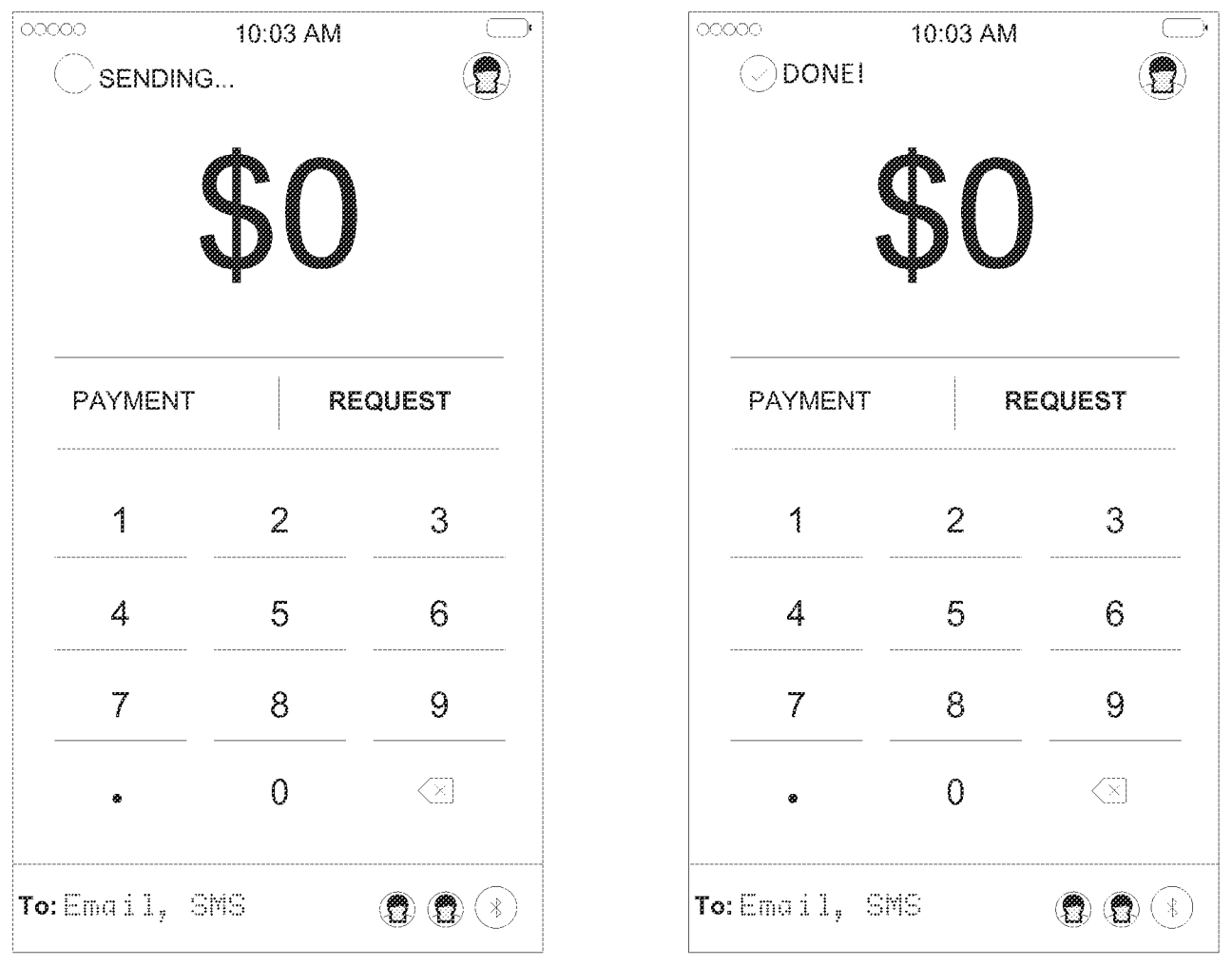

Depending on the embodiment, either after the mobile device 112 is detected or after the mobile device 112 is verified, the mobile device 102 can receive user information about the mobile device 112 (e.g., the user 111's name, nickname, portrait, email or contact information, etc.) from the PSS 108. The mobile device 102 can display the received user information on the display of the mobile device 102 for the user 101 to identify the user 111. In some examples, the mobile device 112 is displayed as an icon once detected, and the icon is replaced by the user information once the mobile device 112 is verified by and the user information received from the PSS 108. In various embodiments, the user of the detected device has control over what user information is to be displayed. After the user information is received, a screen such as FIG. 8A can be displayed by the mobile application 120 to the user 101. As shown in FIG. 8A, the displayed screen can show a list that includes the users (e.g., user 802) of those detected devices that are detected in proximity for the user 101 to select (e.g., for purposes of conducting proximity-based payments). These users can be further identified by an icon 804 and a description 806 to indicate that they are displayed for the reasons of being in proximity. Other users, such as the users who has recently conducted payments with the user 101, can also be displayed in the list. FIG. 8B shows an alternative implementation of the screen of FIG. 8A.

In some embodiments, either the mobile application 120 or the PSS 108 can identify, from those physically-proximate devices, a list of devices with users that are socially connected to the user 101. Then, the user 101 can configure the mobile application 120 so that it only provides information regarding identities of the users socially connected to the user 101. More specifically, in some embodiments, the mobile application 120 can detect people in the vicinity (e.g., for those people that have their "detectability" turned on) The proximately-located devices can either be discovered directly by the mobile device 102 using, for example, BLE, or can be discovered by the PSS 108 based on the PSS 108's understanding of devices located in proximate geographic regions. Either way, the PSS 108 or the mobile application 120 can recognize a list of people nearby, but only provides information relating to people known or otherwise socially connected with the user to be displayed as people in the proximate list. In some examples, a person can be regarded as "socially connected" because the user 101 has previously had a payment transfer or financial transaction with this person. In other examples, either the mobile application 120 or the PSS 108 can have access to the user 101's social network account (e.g., a Facebook™, a LinkedIn™, or other suitable social networking sites) and determines that this person is socially connected to (e.g., within a social circle of) the user 101.

Moreover, after aforesaid measurements of received signal strengths sent from all the detected mobile devices (e.g., devices 112 and 122) in proximity (e.g., within the BLE network), the mobile device 102 can sort all detected mobile devices based on their received signal strengths. As a variation, the mobile device 102 can also sort all detected mobile devices based on a frequency of past payments conducted between the mobile device 102 and each of the detected mobile devices. For example, the user 101 can set up, in the mobile device 102, a black list for those devices that are disallowed for proximity-based payment, a white list for those that are allowed, and/or a favorite list for those that are to be displayed on the top of the list (or as highlighted in a map) of all detected devices.

By displaying information indicative of the mobile device 112 to the user 101, the mobile device 102 prompts (430), via the display of the mobile device 102, the user 101 to select or confirm the mobile device 112 for a proximity-based payment. As discussed above, the payment can be from or to the mobile device 102, which can be chosen by the user 101. As illustrated in the example scenario of FIG. 3, because the payment is assumed to be made from the mobile device 102 to the mobile device 112, upon selection (e.g., by a click on the displayed screen of FIG. 8A or FIG. 8B) from the user 101 of the mobile device 112, the mobile device 112 prompts (430) the user 101 to enter or approve an amount for the payment to the user 111 of the mobile device 112, such as shown in an example display illustrated in FIG. 8C. In an additional or alternative embodiment, an example interface illustrated in FIG. 8D can be used to replace the interfaces illustrated in FIGS. 8A-8C. Note that the display of FIG. 8D includes an input area 808 (which is labeled as "To:" field) that can display the detected, nearby users. The interface of FIG. 8D also provides the amount input functionality of FIG. 8C. Depending on the application, the example display of FIG. 8D may be more beneficial than that of FIGS. 8A-8C because it reduces the number of interfaces that the user 101 has to go through to conduct the payment transfer, thereby increasing the convenience factor.

Note that, as is further discussed below, in the examples where the mobile device 102's proximity-based payment is initiated in response to a request from the mobile device 112, it may not be necessary for the user 101 to enter the amount for the payment; because the amount can be received from the mobile device 112, the user 101 may only need to approve (rather than enter) the amount for the payment. By the same token, it may not be necessary for the user 101 to select the mobile device 112; if the payment is initiated in response to the mobile device 112's request, then the user 101 may only need to confirm (rather than select) the mobile device 112 for the payment. For example, in the display illustrated in FIG. 8E, trusted contacts can be pre-filled in the To: field 810. In some embodiments, trusted contacts are also indicated by a predetermined icon 812. Optionally, a keyboard 814 can be displayed (e.g., upon the user 101 selecting the To: field 810) to enable search or edits.

After the payment information is confirmed by the user 101, the mobile device 102 causes (440) the amount to be transferred from the financial account associated with the mobile device 102 to the financial account associated with the mobile device 112. More specifically, after the user 101 has input or confirmed the payment information to the mobile device 102, the mobile payment application 120 causes the mobile device 102 to transmit a message to convey that payment information to the PSS 108. The PSS 108 then executes or triggers a money transfer process to carry out the payment, according to the payment information received from the mobile device 102. In some examples, to cause the PSS 108 (for example) to carry out the payment, the mobile device 102 communicates with the PSS 108 the unique identifier of the payer (which in this case, mobile device 102), the unique identifier of the payee (which in this case, mobile device 112), and the amount to be transferred. The mobile application 120 can display a transmitting screen and a confirmation screen, such as respectively illustrated in FIGS. 8F and 8G, to the user 101 so as to keep the user 101 informed of the status of the payment transfer.

In some implementations, the mobile application 120 can transmit cause to the PSS 108 to conduct payment transfers between the user 101's financial account and another person's financial account that is identified by the user 101. For example, the mobile application 120 can communicate with the PSS 108 by sending an email, a text message, a multimedia message, or a message that uses a proprietary communication protocol between the mobile application 120 and the PSS 108.

In some examples, the email is generated by an email application separate from the money-transfer application (e.g., a native email application or a third-party email application, such as an Gmail™ application). The email can include an email address associated with the PSS 108. The email can further include, for example, in its body or header portion, an indication of the monetary amount to be transferred to or from the user 101's financial account. In some implementations, the email is generated with pre-populated information including (1) an email address associated with the PSS in an addressee filed and (2) the monetary amount, so that the user 101 only needs to select the send button (such as the "SEND" button shown in FIG. 8C).

Note that, in some embodiments, the email is generated but not displayed to the user 101, and after the email is generated, the email is sent in the background using the email application without user intervention. In some of these embodiments, once the mobile application 120 has received the monetary amount and the identities of the selected users, the mobile application 120 can automatically cause (e.g., by generating an email or a message and sending the email to the PSS 108) the PSS 108 to perform the payment transfer in the background, without the user actually seeing the email or the message and without the need for the user to instruct an email application to send. In this way, since all the required information is already pre-populated, the mobile application 120 improves the user experience by simplifying the payment transfer process, which only requires the user to initiate the process by hitting the "send" button. The user need not see the background process of an email being generated by, for example, an email application of the mobile device 102.

Note that the proximity-based payment from the mobile device 102 to the mobile device 112 can be initiated in response to the mobile device 102 receiving (610), from the mobile device 112, a request for the payment to the user 111. As mentioned above, the request can include the amount for the payment to the user 111 so that the user 101 does not need to specify the amount.

As mentioned above, in some implementations, the mobile payment application 120 can initiate customer-to-customer payment transfers by means of email. In these implementations, the mobile payment application 120 utilizes a third-party email application (e.g., a Gmail™ application) located on the mobile device 102 to transmit an email message that includes, for example, a payment amount to be transferred to a recipient, the recipient's name, a request for the PSS 108 to transfer the payment amount to the recipient, and a message token.

In one example, the user can enter an amount of payment on either the mobile payment application 120 or in the "SUBJECT" field of the third-party email application. The user can also include a message in the body of the email being drafted on the native email application. A security token can be embedded in the email being drafted and can include information regarding sender email address, device characteristic(s) and/or identifier of the payment sender device, financial account information of the sender user (e.g., debit card account information or credit card account information), or any combination thereof. It is noted that even without the financial account information of the sender user, the email can still be sent from the email application. For example, if no financial account information is embedded in the email, the PSS 108 can send a financial account request email to the sender email address requesting that financial account information be entered. The financial account request email can include a secure link to enter the financial account information, such as a debit card number or a credit card number and associated authentication information (e.g., expire date, ZIP Code, PIN number, or security code). After the user 101 chooses to send the email message, a copy of the message is also sent to the PSS 108. The PSS 108 can analyze the email message, identify the mobile device 102, verify that the email message has been sent from an email address of the user 101, and verify that the mobile device 102 is the only one capable of having produced the email message. Having verified the email message (and the authenticity of the request to transfer money), the PSS 108 initiates the process to transfer the payment amount. However, as said above, the user 101 typically still needs to specify a recipient email address (e.g., such as that of the user 111) in the "TO:" field of the third-party email application.

By adapting the techniques introduced here in these implementations, the above process of initiating payment transfers via email can be further simplified. Before the email (i.e., the payment transaction email) is drafted, the mobile payment application 120 can detect the physical proximity of the mobile device 112, communicate this information regarding its nearby mobile devices to the PSS 108, and receive (425) relevant intelligence related to the nearby mobile devices (such as email address of the user 111) from the PSS 108. Then, the mobile payment application 120 can automatically enter the received information for the user 101 for facilitating the proximity-based payment transfers. For example, the mobile payment application 120 can prompt the user 101 to select from a list of potential receivers (of the payment) that have been detected nearby, and the user 101 is given the choice to select or not select each potential payee. In variations, the mobile application 120 can generate a list of suggested payers based on, for example, the consumer's address book stored in the mobile device 120 and/or the consumer's recently used contacts stored on the mobile device 120. Upon the user 101 indicating that he is satisfied with the selections (e.g., by clicking a "Pay" button provided on a user interface), the mobile payment application 120 can proceed with the next steps of the payment transfer procedures (e.g., launching the third-party email application of the mobile device 120 to draft a payment transaction email).

In accordance with some embodiments, the mobile device 102 can also actively send out request for payment using the proximity-based payment techniques. In the example of FIG. 3, when the user 101 desires to collect payment from the user 121, the mobile device 102 first detects that the mobile device 122 is in proximity (e.g., within the BLE network) in ways described above. Similarly to how the mobile device 102 establishes proximity-based payment with the mobile device 112, the mobile device 102 can also receive, from the mobile device 122, a signal indicating whether the it allows conducting payments with the mobile device 102.

After detecting and verifying the mobile device 122's eligibility for conducting proximity-based payments, the mobile device 102 can enable (710) the user 101 to request a payment from the user 121 by prompting the user 101 to (a) select the mobile device 121 for the payment, and (b) specify an amount for the payment. Adapting the techniques herein, various embodiments of the mobile payment application 120 can let the user 101 enter how many shares of payments in total, and can let the user 101 choose how to split the bill (e.g., by spreading out evenly, by specifying an amount for each share, etc.). Thereafter, the mobile device 102 transmits (720) (e.g., via the BLE network), to the mobile device 122, a request for the payment.

In the case that certain parties in the social dinning event are not eligible for proximity-based payment (e.g., because their mobile devices are not present, or their mobile payment application are shut off), the mobile payment application 120 can still enable the user 101 to request a payment by (a) prompting the user 101 to enter an electronic mail address of such party, and (b) transmitting, to the electronic mail (email) address, a request for the payment. Note that, after the mobile device 102 sends out the request to the mobile device 122, the mobile device 122 can perform proximity-based payment to the mobile device 102 in a similar manner as how the mobile device 102 conducts proximity-based payment to the mobile device 112. For those embodiments that utilize email as means for facilitating the payment transfer, the email addresses associated with those devices that are detected in proximity to the mobile device 102 can be transmitted from the PSS 108 to the mobile device 102. Also, using similar techniques introduced here, the mobile payment application 120 can facilitate payment transfers with (including from and to) multiple other devices that are nearby. For example, depending on the implementation, the mobile payment application 120 can send out a single email to multiple recipients, or separate emails to each individual recipients.

In the aforementioned manner, the techniques introduced here enable one customer to pay another quickly and easily compared to traditional methods. Furthermore, without the prerequisites of a customer having any information (e.g., an email address or a phone number) about another, the introduced techniques enable users to conduct payments with each other as long as they are in physical proximity, thereby greatly reducing the potential for awkward interruptions to the social flow of group events due to bill splitting issues, even in group events that include multiple distinct social circles.

Figure 9:
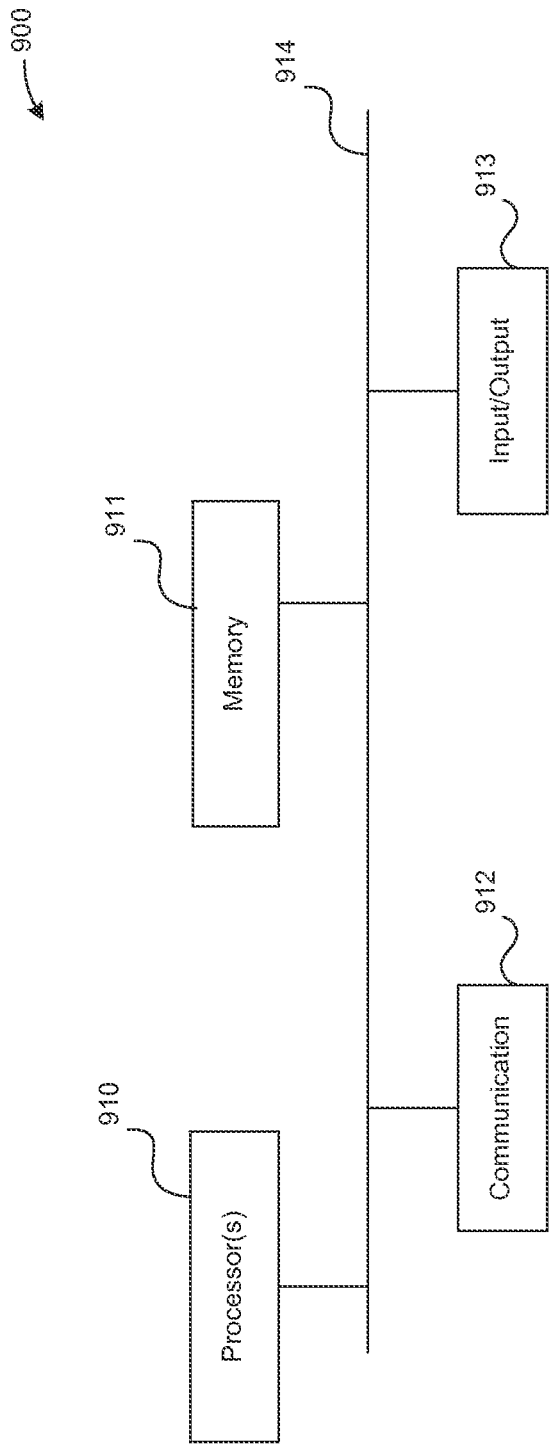
FIG. 9 is a high-level block diagram showing an example of processing system in which at least some operations related to the generation of the disclosed quick legend receipt(s) can be implemented.

FIG. 9 is a high-level block diagram showing an example of a processing device 900 that can represent any of the devices described above, such as the mobile device 102, the merchant POS system 104, payment service system 108, acquirer system 114, card payment network 116, or issuer system 118. As noted above, any of these systems may include two or more processing devices such as represented in FIG. 9, which may be coupled to each other via a network or multiple networks.

In the illustrated embodiment, the processing system 900 includes one or more processors 910, memory 911, a communication device 912, and one or more input/output (I/O) devices 913, all coupled to each other through an interconnect 914. The interconnect 914 may be or include one or more conductive traces, buses, point-to-point connections, controllers, adapters and/or other conventional connection devices. The processor(s) 910 may be or include, for example, one or more general-purpose programmable microprocessors, microcontrollers, application specific integrated circuits (ASICs), programmable gate arrays, or the like, or a combination of such devices. The processor(s) 910 control the overall operation of the processing device 900. Memory 911 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 911 may store data and instructions that configure the processor(s) 910 to execute operations in accordance with the techniques described above. The communication device 912 may be or include, for example, an Ethernet adapter, cable modem, Wi-Fi adapter, cellular transceiver, Bluetooth transceiver, or the like, or a combination thereof. Depending on the specific nature and purpose of the processing device 900, the I/O devices 913 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium can include recordable/non-recordable media (e.g., read-only memory (ROM), random access memory (RAM), magnetic disk storage media, optical storage media, flash memory devices, etc.).

Note that any and all of the embodiments described above can be combined with each other, except to the extent that it may be stated otherwise above or to the extent that any such embodiments might be mutually exclusive in function and/or structure.

Although the present disclosure has been described with reference to specific exemplary embodiments, it will be recognized that the techniques introduced here are not limited to the embodiments described. Accordingly, the specification and drawings are to be regarded in an illustrative sense rather than a restrictive sense.

What is claimed is:

1. A computer-implemented method, comprising:
    in association with a transaction between a first payer, a second payer, and a payee, detecting, by a first mobile device associated with the first payer and via an application executing on the first mobile device, a second mobile device associated with the second payer and that is in physical proximity to the first mobile device, wherein the second mobile device is associated with an identifier of the second payer and the physical proximity is determined based on network connectivity of the first mobile device and the second mobile device, wherein the first mobile device and the second mobile device are communicatively coupled to a remote server and each of the first mobile device and the second mobile device transmit respective location information to the remote server to be used for detecting the physical proximity of the first mobile device and the second mobile device;
    determining that the second mobile device is permitted to conduct proximity-based payments; and
    upon determining that the second mobile device is permitted to conduct proximity-based payments, transmitting, by the first mobile device and via the application, the identifier of the second payer and a specified portion of a payment amount associated with the transaction to the remote server, wherein the remote server is configured to transmit a request to the second mobile device to process a transfer of the portion of the payment amount from a financial account of the second payer in association with the transaction.

2. The computer-implemented method of claim 1 further comprising receiving, by the first mobile device, the identifier of the second payer from the second mobile device.

3. The computer-implemented method of claim 1, further comprising receiving, by the first mobile device, the identifier of the second payer from the remote server.

4. The computer-implemented method of claim 1, wherein the portion of the payment amount is transferred from the financial account of the second payer to a financial account of the first payer in association with the transaction.

5. The computer-implemented method of claim 4, wherein the payment amount associated with the transaction is transferred to a financial account of the payee from the financial account of the first payer.

6. The computer-implemented method of claim 1, wherein the portion of the payment amount is transferred from the financial account of the second payer to a financial account of the payee in association with the transaction.

7. The computer-implemented method of claim 1, wherein detecting the second mobile device associated with the second payer and that is in physical proximity to the first mobile device comprises:
    determining, by the first mobile device, a location of the first mobile device;
    transmitting, by the first mobile device and to the remote server, the location of the first mobile device; and
    receiving, by the first mobile device and from the remote server, one or more nearby mobile devices within a physical proximity of the first mobile device based on a location of the second mobile device, wherein the second mobile device is one of the nearby mobile devices.

8. A computer-implemented method, comprising:
    in association with a transaction between a first payer and a payee, determining by a first mobile device associated with the first payer and via an application executing on the first mobile device, a second mobile of a second payer that is associated with the transaction in physical proximity of the first mobile device, wherein the physical proximity is determined based on network connectivity of the first mobile device and the second mobile device, wherein the first mobile device and the second mobile device are communicatively coupled to a remote server and each of the first mobile device and the second mobile device transmit respective location information to the remote server to be used for detecting the physical proximity of the first mobile device and the second mobile device;
    providing, on the first mobile device, an indication that the second mobile device permits proximity-based transactions; and
    transmitting, by the first mobile device and via the application, an identifier associated with the second payer and a specified portion of a payment amount associated with the transaction to a remote server, wherein the remote server is configured to transmit a request to a second mobile device executing on the second mobile device to process a transfer of the portion of the payment amount from a financial account of the second payer in association with the transaction.

9. The computer-implemented method of claim 8, wherein the second payer is associated with the transaction based on the second mobile device being in physical proximity with the first mobile device.

10. The computer-implemented method of claim 8, wherein the second payer is associated with the transaction based on the second payer being identified from a set of contacts associated with the first payer and stored in the first mobile device.

11. The computer-implemented method of claim 8, wherein the second payer is associated with the transaction based on the second payer being identified from a set of recent contacts with whom the first payer has conducted transactions.

12. The computer-implemented method of claim 8, wherein the second payer is associated with the transaction based on the second payer being identified from a set of social networking contacts of the first payer.

13. The computer-implemented method of claim 8, wherein the identifier associated with the second payer uniquely identifies the second mobile device.

14. The computer-implemented method of claim 8, further comprising receiving, by the first mobile device and from the remote server, an indication of confirmation of payment of the portion of the payment amount from the financial account of the second payer in association with the transaction.

15. The computer-implemented method of claim 8, further comprising:
   receiving, by the first mobile device, an indication that the second payer is not eligible for proximity-based identification for a transaction; and
   receiving, by the first mobile device and via a user interface of the application executing on the first mobile device, the identifier associated with the second payer.

16. A non-transitory computer-readable storage medium storing instructions that, when executed by a first mobile device associated with a first payer, cause the first mobile device to:
   in association with a transaction between the first payer and a payee, determine a second mobile device of second payer that is associated with the transaction in physical proximity of the first mobile device, wherein the physical proximity is determined based on network connectivity of the first mobile device and the second mobile device, wherein the first mobile device and the second mobile device are communicatively coupled to a remote server and each of the first mobile device and the second mobile device transmit respective location information to the remote server to be used for detecting the physical proximity of the first mobile device and the second mobile device;
   determine that the second mobile device is permitted to conduct proximity-based payments; and
   upon determining that the second device is permitted to conduct proximity-based payments, transmit an identifier associated with the second payer and a specified portion of a payment amount associated with the transaction to a remote server, wherein the remote server is configured to transmit a request to a second mobile device executing on the second mobile device to process a transfer of the portion of the payment amount from a financial account of the second payer in association with the transaction.

17. The non-transitory computer-readable storage medium of claim 16, wherein the second payer is associated with the transaction based on the second mobile device being in physical proximity with the first mobile device.

18. The non-transitory computer-readable storage medium of claim 16, wherein the second payer is associated with the transaction based on the second payer being identified from a set of contacts associated with the first payer and stored in the first mobile device.

19. The non-transitory computer-readable storage medium of claim 16, wherein the second payer is associated with the transaction based on the second payer being identified from a set of recent contacts with whom the first payer has conducted transactions.

20. The non-transitory computer-readable storage medium of claim 16, wherein the second payer is associated with the transaction based on the second payer being identified from a set of social networking contacts of the first payer.

* * * * *